(12) United States Patent
Ordonez et al.

(10) Patent No.: US 10,679,087 B2
(45) Date of Patent: Jun. 9, 2020

(54) SYSTEMS AND METHODS FOR MERGING WORD FRAGMENTS IN OPTICAL CHARACTER RECOGNITION-EXTRACTED DATA

(71) Applicant: Google, LLC, Mountain View, CA (US)

(72) Inventors: Ivan Ordonez, Boulder, CO (US); Swaminathan Krishnamurthy, Mountain View, CA (US); David Paul, Lafayette, CO (US); Tushar Udeshi, Broomfield, CO (US)

(73) Assignee: Google LLC, Mountain View, CA (US)

( * ) Notice: Subject to any disclaimer, the term of this patent is extended or adjusted under 35 U.S.C. 154(b) by 153 days.

(21) Appl. No.: 15/956,547

(22) Filed: Apr. 18, 2018

(65) Prior Publication Data
US 2019/0325247 A1 Oct. 24, 2019

(51) Int. Cl.
*G06K 9/34* (2006.01)
(52) U.S. Cl.
CPC .............. *G06K 9/342* (2013.01); *G06K 9/344* (2013.01); *G06K 9/348* (2013.01); *G06K 2209/01* (2013.01)
(58) Field of Classification Search
CPC ........ G06K 9/342; G06K 9/344; G06K 9/348; G06K 2209/01
USPC ................................... 382/176–179
See application file for complete search history.

(56) References Cited

U.S. PATENT DOCUMENTS

2010/0149569 A1\* 6/2010 Yoshida ............. G06K 9/00442
358/1.11
2017/0372156 A1\* 12/2017 Kalenkov ............. G06F 17/212

\* cited by examiner

*Primary Examiner* — Andrew M Moyer
(74) *Attorney, Agent, or Firm* — Foley & Lardner LLP

(57) ABSTRACT

Systems and methods for merging adjacent word fragments in outputs of optical character recognition (OCR) systems can include a processor obtaining word fragments associated with OCR data generated from an image. Each word fragment can be associated with a respective text line of a plurality of text lines. The at least one processor can determine, for each pair of adjacent word fragments in a text line, a respective normalized horizontal distance between the pair of adjacent word fragments. The processor can identify one or more pairs of adjacent word fragments that are candidates for merging based on the determined normalized horizontal distances. The processor can determine that a pair of adjacent word fragments, among the one or more pairs of adjacent word fragments that are candidates for merging, matches a predefined expression of a plurality of predefined expressions, and merge that pair of adjacent word fragments into a single word.

20 Claims, 14 Drawing Sheets

| | | | | | | | | | | | | |
|---|---|---|---|---|---|---|---|---|---|---|---|---|
| Save | money. | Live | better. | # | 00003687 | TE | # | 93 | TR | # | 06108 | |
| ST | # | 1283 | OP | T | | | | | | | | |
| EXCHANGE | SLIP | 978145301342 | 2.97-X | 0 | | | | | | | | |
| SOFIA | FIRST | 978145301342K | 1.00 | 0 | | | | | | | | |
| SOFIA | FIRST | 2.50-0 | 1.38 | | | | | | | | | |
| BUNS | 007341013825KD | 2.50-0 | 1.38 | | | | | | | | | |
| BUNS | 007341013825KD | F | 0.14- | | | | | | | | | |
| BUNS | 007341013825 | F | | | | | | | | | | |
| BUNS | 007341013825 | % | | | | | | | | | | |
| SUBTOTAL | 4.21- | | | | | | | | | | | |
| TAXI | 7.000 | | | | | | | | | | | |
| TOTAL | 4.35 | | | | | | | | | | | |
| ↑ 402 | ↑ 404 | ↑ 406 | ↑ 408 | ↑ 410 | ↑ 412 | ↑ 414 | ↑ 416 | ↑ 418 | ↑ 420 | ↑ 424 | ↑ 426 | |

FIG. 4

|  | money | # | SLIP | FIRST | FIRST | 07341013 825KD | 0734101 3825KD | 7341013825 | 7341013825 | 4.21- | 7 | 4.35 |
|---|---|---|---|---|---|---|---|---|---|---|---|---|
| Save | 0 | 5 | 7 | 8 | 9 | 10 | 11 | 12 | 13 | 14 | 15 | 16 |
| ST | 5 | 0 | 2 | 3 | 4 | 5 | 6 | 7 | 8 | 9 | 10 | 11 |
| EXCHANGE | 7 | 2 | 0 | 1 | 2 | 3 | 4 | 5 | 6 | 7 | 8 | 9 |
| SOFIA | 8 | 3 | 1 | 0 | 1 | 2 | 3 | 4 | 5 | 6 | 7 | 8 |
| SOFIA | 9 | 4 | 2 | 1 | 0 | 1 | 2 | 3 | 4 | 5 | 6 | 7 |
| BUNS | 8 | 5 | 3 | 2 | 1 | 0 | 1 | 2 | 3 | 4 | 5 | 6 |
| BUNS | 10 | 6 | 4 | 3 | 2 | 1 | 0 | 1 | 2 | 3 | 4 | 5 |
| BUNS | 11 | 7 | 5 | 4 | 3 | 2 | 1 | 0 | 1 | 2 | 3 | 4 |
| BUNS | 12 | 8 | 6 | 5 | 4 | 3 | 2 | 1 | 0 | 1 | 2 | 3 |
| SUBTOTAL | 13 | 9 | 7 | 6 | 5 | 4 | 3 | 2 | 1 | 0 | 1 | 2 |
| TAXI | 14 | 10 | 8 | 7 | 6 | 5 | 4 | 3 | 2 | 1 | 0 | 1 |
| TOTAL | 15 | 11 | 9 | 8 | 7 | 6 | 5 | 4 | 3 | 2 | 1 | 0 |

FIG. 5B

|        | #  | T | 0  | 0  |
|--------|----|---|----|----|
| Better.| 5  | 9 | 10 | 11 |
| OP     | 0  | 3 | 4  | 5  |
| 2.97-X | 3  | 1 | 2  | 3  |
| 1      | 4  | 0 | 1  | 2  |
| 1.38   | 7  | 3 | 0  | 1  |
| 1.38   | 8  | 4 | 1  | 0  |
| 0.14-  | 10 | 6 | 13 | 2  |

*FIG. 6A*

← 606 better.

Save money. Live better.

ST # 1283 OP # 00003687 TE # 93 TR # 06108

EXCHANGE SLIP

SOFIA FIRST 978145301342 2.97-X

SOFIA FIRST 978145301342K 1.00 T

BUNS 007341013825KD 2.50-0

BUNS 007341013825KD 2.50-0

BUNS 007341013825 F 1.38 0

BUNS 007341013825 F 1.38 0

SUBTOTAL 4.21-

TAXI 7.000 % 0.14-

TOTAL 4.35

*FIG. 6D*

SYSTEMS AND METHODS FOR MERGING WORD FRAGMENTS IN OPTICAL CHARACTER RECOGNITION-EXTRACTED DATA

BACKGROUND

Optical character recognition (OCR) techniques allow for automatic recognition of text in scanned documents and images. Specifically, a computer system implementing OCR-based tools can detect and identify characters in images, and generate words or text using the identified text or words. While the accuracy of OCR-based tools improved significantly over the years, such tools or techniques still suffer various types of text recognition errors. These recognition errors are usually fixed manually by humans revising output text provided by OCR-based tools. However some types of errors can become more frequent and more significant in OCR extracted data associated with scanned (or imaged) documents having, for example, relatively poor image quality, relatively small text characters, text miss-orientation, or a combination thereof. Also, the accuracy of the OCR-based tools can vary based on the relative positioning of words and expressions in the scanned (or imaged) documents.

SUMMARY

Implementations described herein relate to providing online content of a plurality of products for display on client devices. In particular, implementations described herein relate to generating and providing for display a bundle of a plurality of products each associated with a plurality of sellers in response to a search query.

At least one aspect relates to a computer system for assigning word fragments to lines of text in optical character recognition (OCR) extracted data. The computer system can include at least one processor and a memory storing computer code instructions. The computer code instructions, when executed by the at least one processor, can cause the at least one processor to obtain a plurality of word fragments from OCR generated data associated with an image. The at least one processor can determine vertical coordinates of each of the word fragments in the image. The at least one processor can cluster the plurality of word fragments into one or more clusters of word fragments based on the vertical coordinates of the plurality of word fragments. The at least one processor can assign each word fragment of a respective cluster to a corresponding text line based on the clustering.

The image can include an image of a receipt. The at least one processor can identify, for each word fragment of the plurality of word fragments, a respective bounding box. The at least one processor can determine, for each word fragment of the plurality of word fragments, an orientation angle of the respective bounding box. The at least one processor can rotate a first word fragment of the plurality of word fragments identified by the OCR system, based on the determined orientation angles of the bounding boxes. The at least one processor may rotate the first word fragment by a rotation angle defined based on orientation angles associated with word fragments adjacent to the first word fragment.

The at least one processor can cluster the plurality of word fragments into a plurality of columns. Each column can include one or more word fragments arranged as entries of the column and each entry of the column can include at most one word fragment. The at least one processor can merge the plurality of columns into a single column based on vertical distances between word fragments associated with distinct columns. The at least one processor can (a) select a first column and a second column from the plurality of columns, (b) determine one or more vertical distances between one or more pairs of entries associated with the first and second columns, and (c) merge the first and second columns into a new single column based on the one or more vertical distances. Each pair of entries can include an entry from the first column and an entry from the second column. The vertical distance between the pair of entries can be defined based on the vertical positions of the word fragments, associated with the pair of entries, in the image. The at least one processor can repeat operations (a)-(c) until the plurality of columns are all merged into the single column. In selecting a first column and a second column from the plurality of columns, the at least one processor may select a pair of horizontally adjacent columns.

The at least one processor can apply Needleman-Wunsch alignment algorithm in merging the first and second columns into a new single column based on the one or more vertical distances includes. The at least one processor may assign, for each pair of entries of the selected first and second columns, a respective first cost of merging the pair of entries into a corresponding single entry in the new single column. The respective first cost can be defined based on the vertical distance between the pair of entries. The at least one processor may assign, for each entry in the selected first and second columns, a respective second cost of not merging the word fragment to any other entry in the selected first and second columns. The at least one processor may merge the first and second columns based on the assigned first costs and the assigned second costs. The at least one processor can construct a matrix with entries of the matrix defined based on the first costs and the second costs. The at least one processor can identify a path within the matrix associated with a minimum total cost. The at least one processor can merge the first and second columns based on the identified path.

At least one aspect relates to a method of assigning word fragments to lines of text in optical character recognition (OCR) generated data. The method can include obtaining a plurality of word fragments from OCR data generated from an image. The method can include determining vertical coordinates of each of the word fragments in the image. The method can include clustering the plurality of word fragments into one or more clusters of word fragments based on the vertical coordinates of the plurality of word fragments. The method can include assigning each word fragment of a respective cluster to a corresponding text line based on the clustering.

The image can include an image of a receipt. The method of can include identifying, for each word fragment of the plurality of word fragments, a respective bounding box. The method can include determining, for each word fragment of the plurality of word fragments, an orientation angle of the respective bounding box. The method can include rotating a first word fragment of the plurality of word fragments identified by the OCR system, based on the determined orientation angles of the bounding boxes. In clustering the plurality of word fragments into one or more clusters of word fragments, the method can include clustering the plurality of word fragments into a plurality of columns such that each column can include one or more word fragments arranged as vertical entries of the column and each entry of the column can include at most one word fragment. The method can include merging the plurality of columns into a single column based on vertical distances between word fragments associated with distinct columns.

In merging the plurality of columns into a single column based on vertical distances between word fragments associated with distinct columns, the method can include (a) selecting a first column and a second column from the plurality of columns, (b) determining one or more vertical distances between one or more pairs of entries associated with the first and second columns, and (c) merging the first and second columns into a new single column based on the one or more vertical distances. Each pair of entries can include an entry from the first column and an entry from the second column. The vertical distance between the pair of entries can be defined based on the vertical positions of the word fragments, associated with the pair of entries, in the image. The method can include repeating operations (a)-(c) until the plurality of columns are all merged into the single column. In selecting a first column and a second column from the plurality of columns, the method can include selecting a pair of horizontally adjacent columns.

In merging the first and second columns into a new single column based on the one or more vertical distances, the method can include applying Needleman-Wunsch alignment algorithm. In merging the first and second columns into a new single column based on the one or more vertical distances, the method can include assigning, for each pair of entries of the selected first and second columns, a respective first cost of merging the pair of entries into a corresponding single entry in the new single column, such that the respective first cost defined based on the vertical distance between the pair of entries. The method can include assigning, for each entry in the selected first and second columns, a respective second cost of not merging the word fragment to any other entry in the selected first and second columns. The method can include merging the first and second columns based on the assigned first costs and the assigned second costs. The method can further include constructing a matrix with entries of the matrix defined based on the first costs and the second costs, identifying a path within the matrix associated with a minimum total cost, and merging the first and second columns based on the identified path.

At least one aspect relates to a computer-readable storage device storing instructions that, when executed by one or more processors, cause the one or more processors to perform several operations for assigning word fragments to lines of text in optical character recognition (OCR) generated data. The operations can include obtaining a plurality of word fragments from OCR data generated from an image, and determining vertical coordinates of each of the word fragments in the image. The operations can include clustering the plurality of word fragments into one or more clusters of word fragments based on the vertical coordinates of the plurality of word fragments, and assigning each word fragment of a respective cluster to a corresponding text line based on the clustering.

At least one aspect relates to a computer system for merging adjacent word fragments in outputs of optical character recognition (OCR) systems. The computer system comprising can include at least one processor and a memory storing computer code instructions. The computer code instructions, when executed by the at least one processor, can cause the at least one processor to obtain a plurality of word fragments associated with OCR data generated from an image. Each word fragment of the plurality of fragments can be associated with a respective text line of a plurality of text lines. The at least one processor can determine, for each pair of adjacent word fragments in a text line of the plurality of text lines, a respective normalized horizontal distance between the pair of adjacent word fragments. The at least one processor can identify, in the text line of the plurality of text lines, one or more pairs of adjacent word fragments that are candidates for merging based on the determined normalized horizontal distances. The at least one processor can determine that a pair of adjacent word fragments, among the one or more pairs of adjacent word fragments that are candidates for merging, matches a predefined expression of a plurality of predefined expressions. The at least one processor can merge the pair of adjacent word fragments that matches the predefined expression into a single word, responsive to determining that the pair of adjacent word fragments matches the predefined expression.

The image can include an image of a receipt. The plurality of predefined expressions can include an expression of prices associated with the receipt. The plurality of predefined expressions can include an expression of item codes or identifiers (IDs) associated with the receipt. The plurality of word fragments can be arranged into the plurality of text lines. The at least one processor can determine a length of a gap between the pair of adjacent word fragments, and divide the length of the gap between the pair of adjacent word fragments by a dimension of the image. The dimension of the image can include a width of the image. The dimension of the image can include a width of a text segment of the image.

The at least one processor can compare, for each pair of adjacent word fragments in a text line of the plurality of text lines, the respective normalized horizontal distance between the pair of adjacent word fragments to a threshold value. The at least one processor can identify the pair of adjacent word fragments as a candidate for merging upon determining that the respective normalized horizontal distance between the pair of adjacent word fragments is smaller than or equal to the threshold value.

The at least one processor can match three or more consecutive word fragments, among the one or more pairs of adjacent word fragments that are candidates for merging, to one other predefined expression among the plurality of predefined expressions. The at least one processor can merge the three or more consecutive word fragments into a single word, responsive to matching the three or more consecutive word fragments to the one other predefined expression.

At least one aspect relates to a method of merging adjacent word fragments in outputs of optical character recognition (OCR) systems. The method can include obtaining a plurality of word fragments associated with OCR data generated from an image. Each word fragment of the plurality of fragments can be associated with a respective text line of a plurality of text lines. The method can include determining, for each pair of adjacent word fragments in a text line of the plurality of text lines, a respective normalized horizontal distance between the pair of adjacent word fragments. The method can include identifying, in the text line of the plurality of text lines, one or more pairs of adjacent word fragments that are candidates for merging based on the determined normalized horizontal distances. The method can include determining that a pair of adjacent word fragments, among the one or more pairs of adjacent word fragments that are candidates for merging, matches a predefined expression of a plurality of predefined expressions. The method can include merging the pair of adjacent word fragments that matches the predefined expression into a single word, responsive to determining that the pair of adjacent word fragments matches the predefined expression.

The image can include an image of a receipt. The plurality of predefined expressions can include an expression of prices associated with the receipt. The plurality of predefined expressions can include an expression of item codes or identifiers (IDs) associated with the receipt. The plurality of word fragments can be arranged into the plurality of text lines. The method can include determining a length of a gap between the pair of adjacent word fragments, and dividing the length of the gap between the pair of adjacent word fragments by a dimension of the image. The dimension of the image can include a width of the image. The dimension of the image can include a width of a text segment of the image.

The method can include comparing, for each pair of adjacent word fragments in a text line of the plurality of text lines, the respective normalized horizontal distance between the pair of adjacent word fragments to a threshold value. The method can include identifying the pair of adjacent word fragments as a candidate for merging upon determining that the respective normalized horizontal distance between the pair of adjacent word fragments is smaller than or equal to the threshold value.

The method can include matching three or more consecutive word fragments, among the one or more pairs of adjacent word fragments that are candidates for merging, to one other predefined expression among the plurality of predefined expressions. The method can include merging the three or more consecutive word fragments into a single word, responsive to matching the three or more consecutive word fragments to the one other predefined expression.

At least one aspect relates to a computer-readable storage device storing instructions that, when executed by one or more processors, cause the one or more processors to perform several operations for assigning word fragments to lines of text in optical character recognition (OCR) generated data. The operations can include obtaining a plurality of word fragments associated with OCR data generated from an image. Each word fragment of the plurality of fragments associated with a respective text line of a plurality of text lines. The operations can include determining, for each pair of adjacent word fragments in a text line of the plurality of text lines, a respective normalized horizontal distance between the pair of adjacent word fragments. The operations can include identifying, in the text line of the plurality of text lines, one or more pairs of adjacent word fragments that are candidates for merging based on the determined normalized horizontal distances. The operations can include determining that a pair of adjacent word fragments, among the one or more pairs of adjacent word fragments that are candidates for merging, matches a predefined expression of a plurality of predefined expressions. The operations can include merging the pair of adjacent word fragments that matches the predefined expression into a single word, responsive to determining that the pair of adjacent word fragments matches the predefined expression.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 4 shown example clustering of the word fragments (or words) of FIG. 2 into a plurality of columns.

FIG. 5B shows a table depicting vertical distances between word fragments associated with the first two columns of FIG. 4.

FIG. 6A shows a table depicting vertical distances between word fragments from two other columns of FIG. 4.

FIGS. 6C and 6D show a column representing a merger of two columns from FIG. 4 based on the cost matrix of FIG. 6B, and an example final column obtained by repeatedly merging pairs of columns in the set of columns shown in FIG. 4, respectively.

Figure 1:
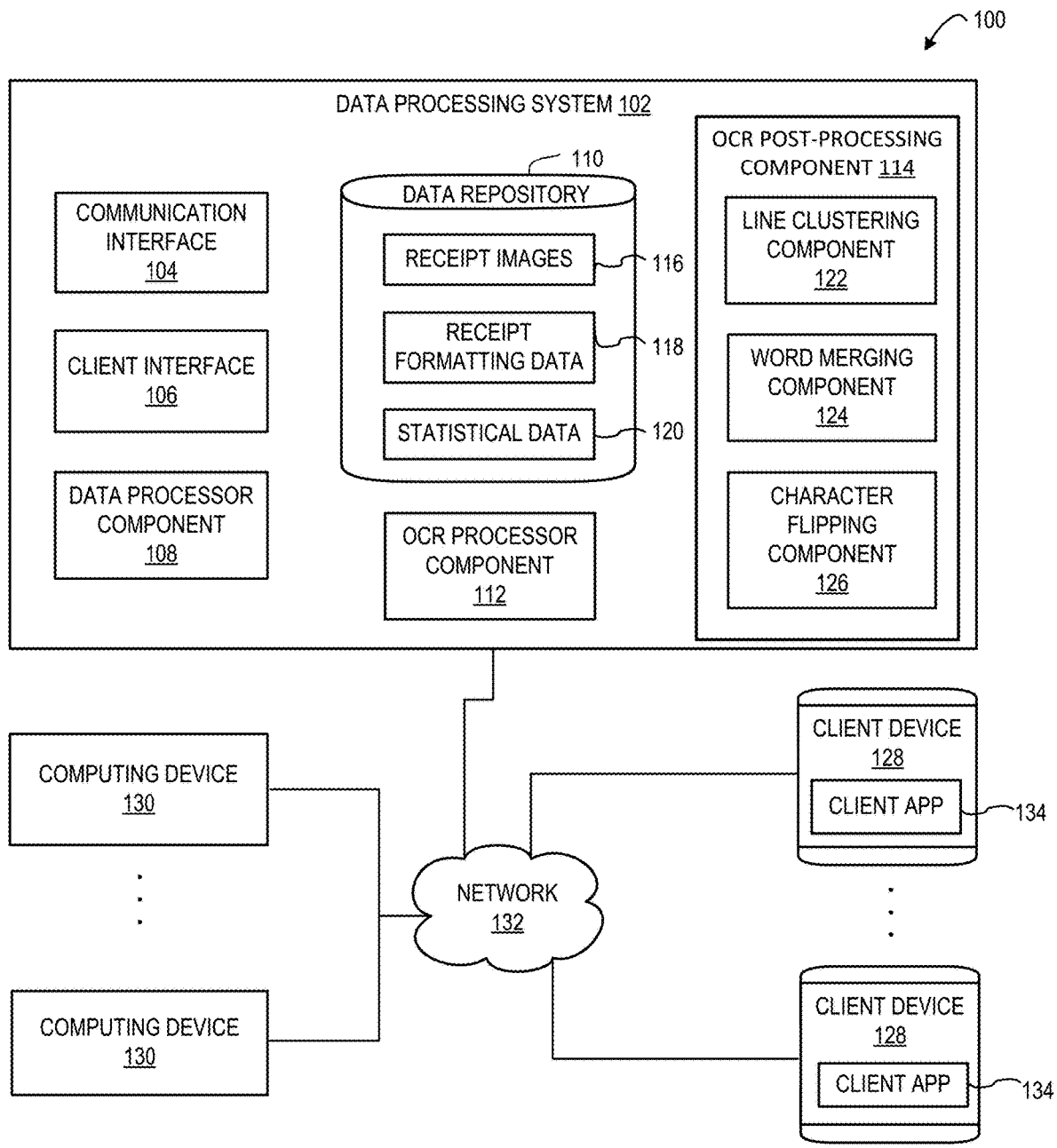
FIG. 1 is a block diagram depicting an implementation of a system of improving the accuracy of optical character recognition (OCR) extracted data via a computer network.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for improving the accuracy of optical character recognition (OCR) extracted data. The various concepts introduced above and discussed in greater detail below may be implemented in any of numerous ways as the described concepts are not limited to any particular manner of implementation. Examples of specific implementations and applications are provided primarily for illustrative purposes.

Despite the recent trend of increasing growth in e-commerce and online shopping, the volume of offline shopping and offline transactions is still, and most likely will be for years to come, substantially large. Accordingly, an extremely large number of paper receipts are issued every day by supermarkets, retailers, convenience stores, furniture stores, or other product or service vendors to respective customers and these receipts carry valuable information to various entities. For example, for buyers, whether individuals or organizations, the respective receipts include indications of the products or services purchased, the amount of each purchased product or service, the total amount of money spent, the price paid for each item or category of items, or a combination thereof. For organizations in particular, monitoring their spending at different levels of granularity is part of daily business. Also, for manufacturers, service providers, or advertisers, transaction receipts can provide valuable information to help evaluate the performance of new products or services, advertising campaigns, or a combination thereof. For example, content providers, such as third-party content providers can use content from offline receipts to monitor offline conversions of content provided by the content providers.

Manual processing of receipts can be costly and time consuming for many businesses. A company may assign a task force of employees to manually process its invoices, employee spending receipts, or other receipts, and record the company's spending. Optical character recognition (OCR) tools or algorithms can allow for computerized processing of receipts. For instance, paper receipts can be scanned or imaged and an OCR system or tool can recognize or extract text from images of the receipts. A computing device implementing an OCR algorithm can detect and identify characters, or sequences of characters forming words or word fragments, in a receipt image and output the identified characters or sequences of characters in a document, to a memory, or to an output device, such as a display device. However, extracting characters or sequences of characters from images of receipts (or other documents, in general) may not be sufficient to extract accurate information. The ordering and alignments of the extracted characters or sequences of characters as well as the spacing between the characters in the imaged receipt (or document) is important in correlating pieces of information together.

OCR tools can generate errors that reduce the accuracy of the extracted data. Such errors may be higher for content extracted from receipts (e.g., compared to other types of scanned documents) due to some characteristics specific to receipts. Content of receipts can include a combination of item codes identifying purchased items, text words indicative of names or descriptions of listed items, and numbers indicative of dates, prices or item quantities. Furthermore, receipts can have different sizes that are usually smaller than a full page. In addition, when scanned or imaged, receipts may not be properly oriented resulting in rotated text or "words" in the scanned receipts. As used herein, a "word" can refer to a word as used in a given language (e.g., English), a code indicative, for example, of a product or service identifier, or a number indicative, for example, of a price or amount value. In other words, a word as used herein can refer to a sequence of characters combined together (e.g., in a given order) to refer to a corresponding meaning (e.g., a value, an entity, an act, etc.). Also, the formatting (or structure) of receipts can vary significantly from one type of receipts to another. These factors (or characteristics) increase the complexity and difficulties associated with recognizing and extracting "words" or a sequence of correlated "words" from a scanned or imaged receipt. In particular, these factors (or characteristics) can lead to various types of errors by OCR tools when processing images of receipts.

Errors associated with OCR tools (or techniques) can include character recognition errors, "word" recognition errors, or text lines' clustering errors. A character recognition error occurs when an OCR tool associates (or maps) a symbol in an image of a receipt to a wrong character. For example, the OCR tool may misinterpret a symbol indicative of "B" as "8" or vice versa. A "word" recognition error may occur when the OCR tool wrongly splits a "word" into two or more word fragments or wrongly combines two or more words (or two or more portions of separates words) into a single "word". A text lines' clustering error may occur when the OCR tool misaligns "words" or expressions. For example, a receipt may have a tabular (or tabular-like) structure, and the OCR tool may assign a "word" to a wrong row. Such error, can result, for example, in assigning a price value, a quantity value, a description, or a name to a wrong item code.

In the present disclosure, methods and system for post-processing documents or output generated by OCR tools to eliminate or reduce the above discussed errors associated with OCR extracted data are described. For example, systems and methods of assigning word fragments to text lines based on vertical coordinates of the word fragments can eliminate or mitigate text lines' clustering errors. According to an example embodiment, a data processing system can cluster word fragments generated or output by the OCR tool into clusters of word fragments based on vertical coordinates of the word fragments. For instance, the data processing system can first cluster the word fragments into a plurality of columns. The data processing system can merge the columns into a single final column based on vertical distances associated with word fragments from different columns. Each entry in the final column represents a text line in the corresponding receipt. The data processing system may employ the Needleman-Wunsch alignment algorithm in merging the columns.

Systems and methods of merging word fragments based on normalized distances between adjacent word fragments and predefined expressions can eliminate or reduce "word" recognition errors. A data processing system can compute or determine distances between horizontally adjacent word fragments and normalize the determined distances by a size of the receipt. For example, the data processing system can normalize the determined distances by a width of receipt or a width of text in the receipt. The data processing can identify adjacent word fragments that are eligible for (or candidates for) merging based on the normalized distances. For example, adjacent word fragments with respective normalized distances smaller than a threshold value can be candidates for merging, while those normalized distances greater than the threshold value are considered for merging. The data processing system can compare adjacent word fragments to predefined expressions and if a match is found, the data processing system can merge the adjacent word fragments to form the matched expression.

Also, systems and methods for character flipping based on statistics of common OCR character recognition errors can improve accuracy of character recognition. For instance, a data processing system can use statistical data indicative of common character recognition errors to determine whether or not to flip a character. Finally, systems and methods for performing a combination of assigning word fragments to text lines based on vertical coordinates of the word fragments, merging word fragments based on normalized distances between adjacent word fragments and predefined expressions, and character flipping based on statistics of common OCR character recognition errors can significantly improve the accuracy of post-processed OCR outputs.

According to example aspects of the present disclosure, systems and methods for improving OCR performance can include a data processing system obtaining a plurality of word fragments OCR extracted from an image of receipt (or documents). The data processing system can assign each of the word fragments to corresponding text line based on vertical coordinates of the word fragments. The data processing system can merge one or more adjacent word fragments in a given text line based on normalized distances between the adjacent word fragments and comparison with predefined expressions. The data processing system can also flip one more characters associated with the word fragments based on statistics of character errors in OCR extracted data, comparison with predefined words or expressions, or a combination thereof. The data processing system can correlate or link words to each other, based on the line clustering, word merging, character flipping, or a combination thereof, an update data stored in a database based on correlations.

FIG. 1 is a block diagram depicting an implementation of a system 100 of improving the accuracy of optical character recognition (OCR) extracted data via a computer network. The system 100 can include a data processing system 102. The data processing system 102 can include a communication interface 104, a client interface 106, a data processor component 108, a data repository 110, an OCR processor component 112, and an OCR post-processing component 114. The data repository 110 can include a sub-repository 116 for storing images of receipts (or images of other documents), a sub-repository 118 for storing predefined data related, for example, to receipt (or other document) formatting, and a sub-repository 120 for storing statistical data. The OCR post-processing component 114 can include a line clustering component 122, a word merging component 124, and character flipping component 126. The data processing system 102 can be communicatively coupled to a plurality of client devices 128 and one or more computing devices 130 via a communications network 132. The computing devices 130 can be associated with product manufacturers, service providers, advertisers, vendors, or a combination thereof. One or more client devices 128 of the plurality of client devices 128 can include client applications 134 for providing image of receipts (or other documents) to the data processing system 102 via the communications network 132.

Each client device 128 can include a computer, laptop, desktop, smart phone, tablet, personal digital assistant, set-top box for a television set, a smart television, or server device configured to communicate with other devices via the network 132. The client device 128 may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 128 can execute a client application 134 (e.g., a web browser, mobile application, web application, or other application) to initiate imaging or scanning of receipts (or other documents), or to initiate transmission of corresponding image data to the data processing system 102. The client device 128 can include a camera or can be communicatively coupled to a scanner. The client device 128 can cause the camera or the scanner to generate images of receipts (or other documents). The client device 128 can obtain images of receipts (or other documents) from one or more other devices. The client device 128 can include a communications interface to transmit images or receipts (or other documents) to the data processing system 102.

The computing devices 130 can include computers, desktops, laptops, smart phones, tablets, or server devices associated with, for example, advertisers, product manufacturers, service providers, product or service vendors, or a combination thereof. Each computing device 130 can include a respective memory, one or more respective processors, and a respective communications interface. The computing device 130 can access, via the network 132, data generated or provided by the data processing system 102. The computing device 130 can receive or access data indicative of information extracted by the data processing system 102 from images of receipts (or images of other documents). For example, the computing device 130 can be associated with an advertiser and can determine or assess ad conversion based on data received from the data processing system 102 via the network 132. The network 132 can include a local area network (LAN), wide area network (WAN), telephone network, such as the Public Switched Telephone Network (PSTN), wireless link, intranet, the Internet, or combinations thereof.

The data processing system 102 can include one or more computer servers (not shown in FIG. 1). For example, data processing system 102 can include a plurality of logically-grouped servers (not shown in FIG. 1) that facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous, e.g., operating according to two or more types of operating system platforms. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high-performance storage systems on localized high-performance networks. Centralization of all or some of the data processing system 102 components, including servers and storage systems, and coupling them with advanced system management tools allows for more efficient use of server resources, which saves power and processing requirements and reduces bandwidth usage.

The data processing system 102 can include a memory device and one or more data processors configured to execute instructions stored in the memory device to perform one or more operations described herein. In other words, the one or more data processors and the memory device of the data processing system 102 may form a processing module. The one or more processors may include a microprocessor, an application-specific integrated circuit (ASIC), a field-programmable gate array (FPGA), etc., or combinations thereof. The memory device may include, but is not limited to, electronic, optical, magnetic, or any other storage or transmission device capable of providing processor with program instructions. The memory device may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The one or more processors may execute instructions to process images of receipts (or other documents) or data thereof and output data to the data repository 110, the computing devices 130, the client devices 128, or a combination thereof.

The data processing 102 can include a communications interface 104. The communications interface 104 can facilitate or allow establishing connections with the client devices 128, the computing devices 130, other external computer devices or systems (e.g., not part of the data processing system 102), or a combination thereof. The communications interface 104 can include communication ports, data transmission circuits or devices, communication protocols (e.g., implemented as hardware, software instructions, or a combinations thereof), one or more network processors, or a combination thereof. The data processing system 102 can include a plurality of communications interfaces 104, for example, associated with a plurality of servers or computing devices.

The data processing 102 can include one or more client interfaces 106. The one or more client interfaces 106 can provide a user interface (e.g., via a web page) to client devices 128 to allow the client devices 128 to provide images of receipts (or other documents) to the data processing system 102. The one or more client interfaces 106 can include a client application interface or a server application for serving the client application 134 running on the client devices 128. To incentivize users of the client devices 128 to provide (or consistently provide) images of receipts (or other images of other documents) for processing by the data processing system 102, the data processing system 102 (or the one or more client interfaces 106) can provide rewards, such as coupons, promotion codes, information (e.g., information feeds or messages) indicative of special deals, or a combination thereof related to given products or services of interest to the users of the client devices 128. The one or more client interfaces 106 can provide the rewards, for example, via the user interface (or webpage) or via the client application 134. The data processing system 102 (or the one or more client interfaces 106) can provide instances of the client application 134 to the client devices 128 to incentivize the client devices 128 or corresponding users to actively participate in providing images of receipts (or other documents).

The client application 134 can allow for initiating a camera of a corresponding client device 128 or a scanner communicatively coupled to the corresponding client device 128 to image or scan a receipt (or other document). The client application 134 can automatically, or upon user trigger action or user input, initiate transmission of data associated with the receipt, (or document) image to the data processing system 102. The client application 134 can include, for example, a personal spending monitoring application that provides tools for monitoring, analyzing, and/or presenting information indicative of spending. Upon receiving receipt images, the data processing system 102 can extract and analyze corresponding data. The data processing system 102 (or the one or more client interfaces 106) can maintain, for example, a separate secure user account for each client device 128, the respective instance of the client application 134, or the respective user. The one or more client interfaces 106 can update account data based on data extracted from images of receipts (or other documents) received from the corresponding client device 128. In some cases, the user account data may be maintained by the client device 128. In such cases, the data processing system 102 can process received images of receipts (or images of other documents) and send corresponding extracted data back to the client device 128. The client device 128 can update user account data based on data received from the data processing system 102. The client application 134, the one or more client interfaces 106, or a combination thereof can allow for analyzing information extracted from receipt images (or images of other documents) to determine spending trends at various levels of granularity (e.g., per product or service, per product or service category, per vendor, per geographic are, per time period, or a combination thereof). When using a personal spending monitoring application, a user of a client device 128 can have an incentive and interest in providing images of receipts. The client application 134 can include other types of applications such as an application to facilitate imaging receipts (or other documents) and transmitting image data to the data processing system 102.

The data processing system 102 can include a data repository 110 for storing data related to processes described herein. The data repository 110 can include one or more databases, one or more data folders, one or more data files, one or more data structures, one or more storage devices, one or more memory segments or portions, or a combination thereof. The data repository 110 can store receipt images 116 (or images of other documents) received, for example, from client devices 128. The data repository 110 (or the data processor component 112) can delete the receipt images 116 or other images after receipt or after processing by the OCR processor component 108 and the OCR post-processing component 114. The data repository 110 can maintain the receipt images 116 for a predefined time period before deletion. The data repository 110 can store receipt (or other document) formatting data 118. The formatting data 118 can include, for example, indications of predefined expression formats (or predefined word formats) of words (including codes, item identifiers (IDs), price values, etc.) typically used in receipts or other documents. The formatting data 118 can include data indicative of layouts or sizes of receipts (or other documents). The OCR processor component 112 or the OCR post-processing component 114 can use the formatting data 118 to process receipt images 116 (or images of other documents) or corresponding data. The data repository 110 can store statistical data 120 that is generated by the data processing system 102 based on information extracted from the receipt images 116 (or images of other documents). The statistical data 120 can include, for example, data indicative of product or service quantities purchased, money amounts of purchasing a product or service, purchase dates, purchase locations, or a combination thereof. The statistical data 120 can also be referred to as offline transactions data.

The data processor component 108 can use data output by the OCR processor component 112 or the OCR post-processing component 114 to generate or update the statistical data 120. For instance, the data processing component 108 can update purchase quantities (e.g., of a product, service, product category or service category), purchase dates, purchase locations, or a combination thereof based on data extracted from receipt images 116. The data processor component 108 can process data extracted from receipt images 116 to determine or identify shopping trends, offline ad conversions, customer or transaction distributions among vendors, retailers, or manufacturers, transaction distributions per time or location, or a combination thereof. The data processor component 108 can process data extracted from image receipts 116 to generate or determine statistics or information requested by a computing device 130.

The OCR processor component 112 can convert text in a scanned document, a photo of a document, a photo of a scene, a sequence of images, or other types of images to machine-encoded text. The text in the scanned document, the photo of the document, the scene photo, the sequence of images, or any other types of images can be typed, handwritten or printed text. The OCR processor component 112 can use pattern recognition techniques, feature detection techniques, nearest neighbor classifiers, or a combination thereof to identify characters in an input image. The OCR processor component 112 can receive an input image, such as a receipt image 116, and identify words or expressions appearing in the input image by applying character recognition techniques. The OCR processor component 112 can determine for each word a corresponding bounding box enclosing that word. The OCR processor component 112 may identify or determine the bounding boxes and identify the sequence (or set) of characters in each bounding box as forming a corresponding word. The OCR processor component 112 may identify words first and then determine for each word the corresponding bounding box.

The accuracy of the OCR processor component 112 can depend on many factors such as quality of input image, availability of prior information about any lexicon constraints, formatting of text in input image, or a combination thereof. Receipt images 116 (or images of other documents, for example, including words or expressions formatted according to a tabular structure or a tabular-like structure) can pose additional challenges for the OCR processor component 112. For instance, the spacing between words or expressions arranged according to a tabular structure or a tabular-like structure can lead to failure in correctly detecting or identifying text lines. Also, the lexicon associated with receipts (or other similar documents) can include a combination of words in a given language (e.g., English language), proper nouns (e.g., names of companies or names products), codes and numbers. As the scope of the relevant lexicon get wider, the likelihood of OCR error can increase. Furthermore, a receipt image 116 may not have a good image quality (e.g., with respect to resolution compared to character sizes, proper orientation, or blurriness).

Figure 2:
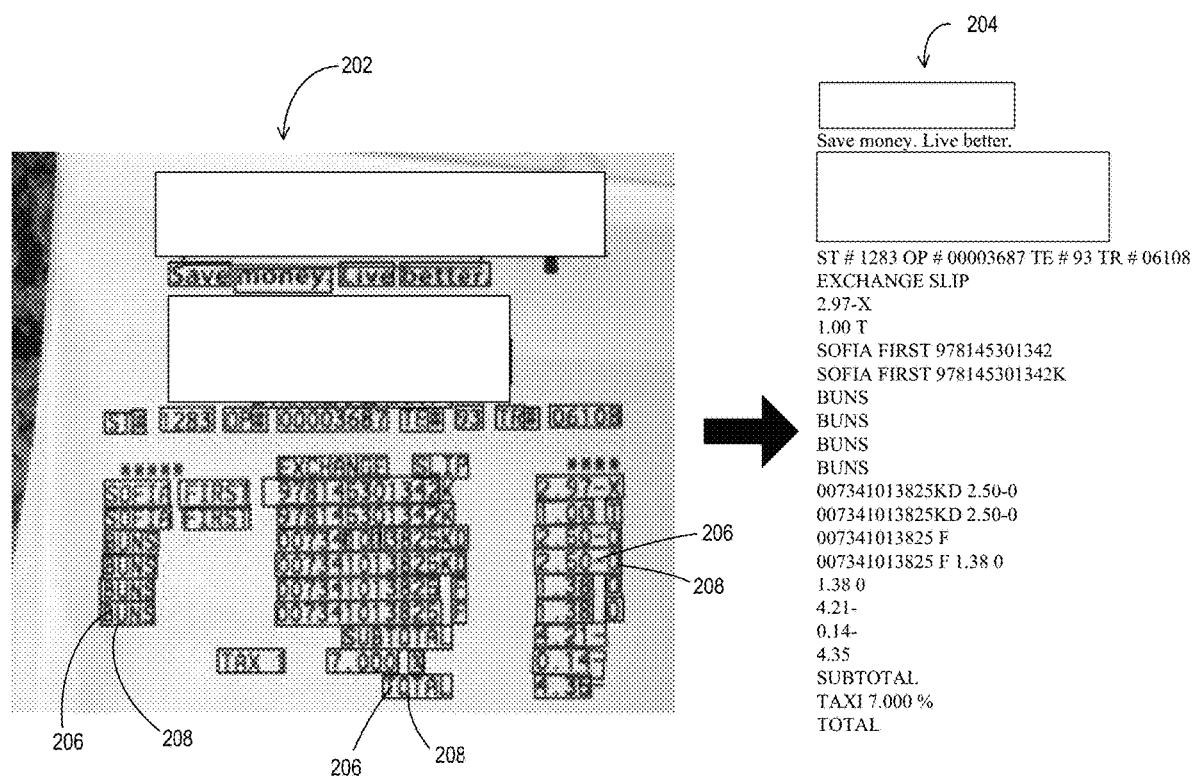
FIG. 2 shows an example receipt image and an example depiction of corresponding OCR extracted data.

FIG. 2 shows an example receipt image 202 and an example depiction of corresponding output OCR extracted data 204. The white rectangular boxes in both the receipt image 202 or the corresponding output OCR extracted data 204 represent redacted portions to conceal the identity of the company and the address of the corresponding store that issued the receipt. The OCR processor component 112 can identify a plurality of words 206 and a plurality of bounding boxes 208 in the receipt image 202. Each bounding box 208 surrounds or encloses a corresponding word 206. The OCR processor component 112 can identify the bounding boxes 208 first and then convert the symbols in each bounding box 208 to corresponding characters to generate a corresponding word, or the OCR processor component 112 can identify the words 206 first and then determine the corresponding bounding boxes 208.

The output OCR extracted data 204 corresponding to the receipt image 202 illustrates at least some of the accuracy or performance errors associated with OCR-based techniques. The OCR processor component 112 can fail, for example, to properly align identified words 206 according to text lines in the receipt image 202. For example, the identified words "BUNS," "007341013825," "F," "1.38," and "0" belong to same text line in the receipt image 202. However, these words are dispersed into multiple text lines in the output OCR extracted data 204. Also, the identified words "SUBTOTAL" and "4-21-" appear in a single text line in the receipt image 202, but they are distributed among two separate text lines in the output OCR extracted data 204. Furthermore, the OCR processor component 112 can mistakenly identify a word fragment as a word. For instance, the word fragments "ST" and "#" forming the word "ST #" can identified by the OCR processor component 112 as two separate words. The same can apply to the word fragments "OP" and "#" forming the word "OP #," the word fragments "TE" and "#" forming the word "TE #," and the word fragments "TR" and "#" forming the word "TR #." Also, the OCR processor component 112 can mistakenly omit "K" in the word "978145301342K" and identify the word fragment "978145301342" as a full word. In addition, the OCR processor component 112 can convert a character symbol to a wrong character. For example, the OCR processor component 112 can wrongly convert the symbol for the number "1" into the letter "I" leading to wrongly converting the expression "TAX 1" in the receipt image 202 to the word "TAXI" in the output OCR extracted data 204. This last example also involves combining two words "TAX" and "1" in the receipt image 202 into a single word "TAXI" in in the output OCR extracted data 204.

Referring back to FIG. 1, the OCR post-processing component 114 can improve the accuracy or performance of the OCR processor component 112, by addressing the above discussed errors associated with OCR-based techniques. For instance, the line clustering component 122 can assign words or word fragments to corresponding text lines in the receipt image 116. The word merging component 124 can merge word fragments wrongly split by the OCR processor component 112. Also, the character flipping component 126 can identify character errors and flip corresponding characters. The OCR post-processing component 114 and components thereof are discussed in further detail with regard to FIGS. 3-X below. While described in FIG. 1 as a separate component, the OCR post-processing component 114 or any combination of the corresponding components (e.g., the line clustering component 122, the word merging component 124 and the character flipping component 126) can be integrated within the OCR processor component 112.

Figure 3:
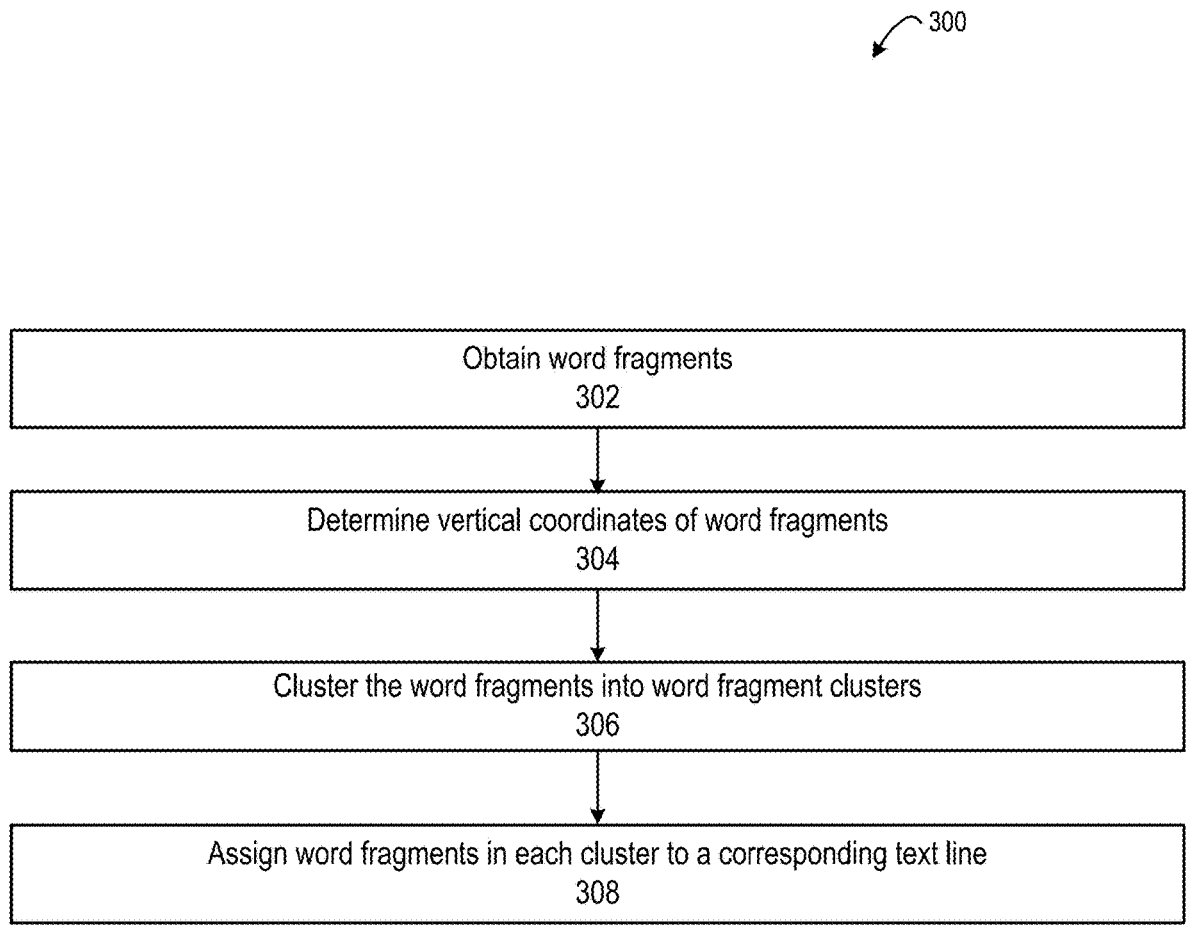
FIG. 3 shows a flowchart illustrating a method of assigning word fragments to lines of text in OCR extracted data.

Referring to FIG. 3, a flowchart illustrating a method 300 of assigning word fragments in OCR extracted data to corresponding lines of text is shown. The method 300 can include obtaining a plurality of word fragments from OCR extracted data (ACT 302). The method 300 can include determining vertical coordinates of the plurality of word fragments (ACT 304). The method 300 can include clustering the word fragments into word fragment clusters (ACT 306). The method 300 can include assigning word fragments in each word fragment cluster to a corresponding text line (ACT 308).

Referring to FIGS. 1-3, the method 300 can be performed by the line cluster component 122. The line cluster component 122 can obtain a plurality of word fragments from OCR extracted data (ACT 302). The line cluster component 122 can obtain the plurality of word fragments from OCR extracted data (such as OCR extracted data 204 in FIG. 2) provided or generated, for example, by the OCR processor component 112 upon processing an input image (such as the receipt image 202 shown in FIG. 2). The OCR processor component 112 can provide or generate the OCR extracted data in a corresponding text document or in one or more corresponding data structures (e.g., a plurality of strings or a linked list of strings). The word fragments provided by the OCR processor component 112 can include words, word fragments, or a combination thereof. In other words, the OCR processor component 112 can convert text in the input image to a plurality of identified words. However, the OCR processor component 112 may mistakenly identify one or more word fragments as separate words, for example, by mistakenly splitting one or more words into a plurality of corresponding word fragments (e.g., as discussed above with regard to the words "ST #," "OP #," "TE #" and "TR #" of FIG. 2). Accordingly, the words identified and output by the OCR processor component 112 are referred to herein as word fragments. As depicted in FIG. 2, the word fragments provided in the OCR extracted data 204 can be separated by spaces in between (in the same horizontal line), can be presented in separate horizontal lines, or a combination thereof.

The line cluster component 122 can determine vertical coordinates of the plurality of word fragments (ACT 304). Each vertical coordinate can represent the y-coordinate of the corresponding word fragment (or word) in the input image. The vertical coordinates (or y-coordinates) can be expressed in terms of pixels, horizontal line numbers, units of length (e.g., centimeters or inches), fractions of the total length of the receipt (or corresponding receipt image), or the like. The OCR processor component 112 can determine the vertical coordinate of each word fragment (or word) as part of processing the input image to recognize text therein, and provide the determined vertical coordinates with (or as part of) the output extracted OCR data. For example, the OCR processor component 112 can determine the vertical coordinate of each word fragment (or word) based on vertical coordinates associated with the corresponding bounding box. For instance, the OCR processor component 112 can compute the vertical coordinate of a word fragment (or word) as the average of the y-coordinates of the four corners, the two left corners, the two right corners, or all the pixels of the corresponding bounding box. The OCR processor component 112 may provide the vertical coordinates of the word fragments (or words) as metadata separate from or in the same document (or in the same data structure(s)) as the word fragments. The line cluster component 122 can retrieve the vertical coordinate of each word fragment (or word) from output provided by OCR processor component 112.

The method 300 may further include the line cluster component 122 identifying, for each word fragment, a corresponding bounding box, and determining an orientation angle of the corresponding bounding box. The OCR processor component 112 can determine for each word fragment (or word) the corresponding bounding box, and provide the coordinates of each bounding box (e.g., the coordinates of the respective four corners) as output. The line cluster component 122 can obtain the coordinates of each bounding box from the output (e.g., a text document or one or more data structures) provided by the OCR processor component 112. The line cluster component 122 can determine for each bounding box the orientation angle of the corresponding upper edge, the orientation angle of the corresponding lower edge, or the average orientation angle for both the corresponding upper and lower edges of the bounding box. The orientation angle of the upper or lower edge can be defined as the angle between that edge and the horizontal level. For example, the line cluster component 122 can compute the tangent of the orientation angle as the difference between the y-coordinates of the points or corners defining the edge divided by the difference between the x-coordinates of the same points or corners. The line clustering component 122 can determine the orientation angle of each bounding box as the orientation angle of the corresponding upper edge, the orientation angle of the corresponding lower edge, or as an average of both.

The line cluster component 122 can rotate a word fragment of the plurality of word fragments by a rotation angle equal to the corresponding orientation angle or equal to the average of orientation angles associated with the corresponding bounding box and respective neighboring (or adjacent) bounding boxes. The adjacent or neighboring bounding boxes can include the immediate neighboring bounding boxes or a subset thereof. Rotating a word fragment can include adjusting (or modifying) the coordinates of the corresponding bounding box to reflect the rotation of the word fragment or the rotation of the bounding box. Rotating the word fragments can correct for miss-orientation of the receipt (or other document) during scanning or miss-orientation of the camera when photographing the receipt (or other document). The line cluster component 122 may obtain the vertical coordinates of the word fragments after rotating one or more word fragments (or adjusting the coordinates of the corresponding bounding boxes) to correct for miss-orientations of the word fragments.

The method 300 can include the line clustering component 122 clustering the word fragments into word fragment clusters (ACT 306). The line clustering component 122 can cluster the plurality of word fragments (or words) using the corresponding vertical coordinates. For example, the line clustering component 122 can use the Gaussian mixture model (GMM) or other clustering techniques to cluster the word fragments using the corresponding vertical coordinates. Such clustering can group the word fragments based on the corresponding text lines in the input image. For instance, the vertical coordinates of words or word fragments that belong to the same text line in the input image (e.g., receipt image 202) can be similar or close to each other. Accordingly, clustering the word fragments (or words) based on the corresponding vertical coordinates can reveal the association between each word fragment (or word) and the corresponding text line in the input image. Specifically, vertical coordinates of word fragments (or words) can be distributed around the vertical coordinates of the text lines in the input image.

The line clustering component 122 can first cluster the plurality of word fragments into a plurality of columns where each column can include one or more word fragments arranged as entries of the column and each entry of the column can include at most one word fragment. Each column does not necessarily represent (or correspond to) an actual column in the input image (e.g., receipt image 202 of FIG. 2). However, each column can represent a cluster of word fragments (or words) with distinct vertical coordinates. Specifically for each pair of word fragments in a given column, the corresponding vertical coordinates can be different from each other. For instance, the line clustering component 122 can form the columns (or vertical clusters) such that for each column, the vertical distance (e.g., difference between vertical coordinates) between any pair of word fragments in that column is greater than or equal to a predefined threshold. The line clustering component 122 can then merge the plurality of columns into a single final column based on vertical distances between word fragments associated with distinct columns. In the final column, each entry can include one or more (or a cluster of) word fragments that belong to the same text line in the input image (e.g., receipt image 202 of FIG. 2).

The line clustering component 122 can order the vertical coordinates of the word fragments (e.g., according to ascending order) and form an ordered set of word fragments according to the ordering of the corresponding vertical coordinates. To form the first column, the line clustering component 122 can select a first word fragment, e.g., having the smallest vertical coordinate, then repeatedly select the next word fragment (in the ordered set of word fragments) that has a corresponding vertical coordinate greater than that of the last selected word fragment (e.g., by at least a predefined vertical distance threshold value) until it reaches the end of the ordered set of word fragments. The selected word fragments would form the first column according to the order they were selected. For example, the first selected word fragment would go into the first entry of the column, and the second selected word fragment would go into the second entry of the column. The line clustering component 122 can update the set of ordered word fragments by removing the already selected word fragments, and form the next column in the same way as the previous one. The line clustering component 122 can continue forming new columns (in the same way as previous ones) until all the word fragments of the ordered set are selected.

FIG. 4 shown example clustering 400 of the word fragments (or words) 206 of FIG. 2 into a plurality of columns. The word fragments (or words) 206 are clustered into 13 different columns 402-426. The line clustering component 122 can, for example, cluster the word fragments (or words) 206 into the columns 402-426, such that for each column (among the columns 402-426) the vertical distance between (or absolute difference between the vertical coordinates of) any pair of word fragments can be greater than or equal to one (e.g., the expected vertical distance between two consecutive text lines in the input image). Also, in each of the columns 402-406, the order of the word fragments in that column reflects strictly increasing vertical coordinates. For example the vertical coordinate of the word fragment in the second entry of a column is greater than that of the word fragment in the first entry of the column, and the vertical coordinate of the word fragment in the third entry of the column is greater than that of the word fragments in the first and second entries of the column.

Figure 5A:
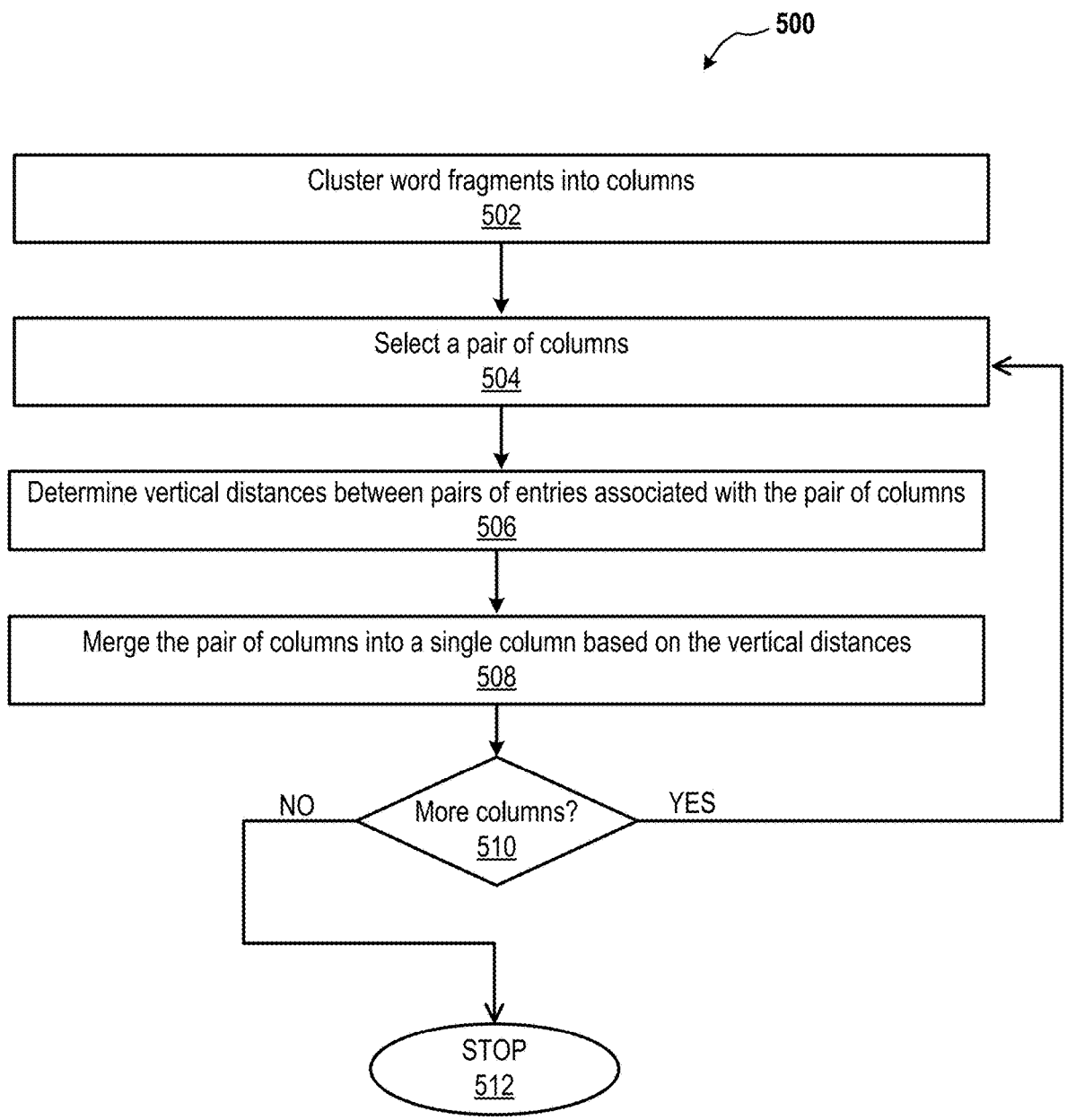
FIG. 5A shows a flowchart illustrating a method of clustering word fragments into one or more text lines.

FIG. 5A shows a flowchart illustrating an example method 500 of clustering word fragments into one or more text lines. The method 500 can include clustering the plurality of word fragments into a set of columns (ACT 502). The method 500 can include selecting a pair of columns (ACT 504), and determining vertical distances between pairs of word fragments associated with the selected pair for columns (ACT 506). The method 500 can include merging the pair of columns into a single column based on the vertical distances (ACT 508). The method 500 can include checking for more columns in the set of columns and repeating ACTS 504-508 until the set of columns is merged into a single final column (DECISION BLOCK 510). The method 500 can stop when the number of remaining columns is equal to one (ACT 512).

Referring to FIGS. 1-5A, the method 500 can include the line clustering component 122 clustering the plurality of word fragments into a set of columns (ACT 502). The line clustering component 122 can order the plurality of word fragments output by the OCR processor component 112 into a set of ordered word fragments according to an ascending (or descending) order of the corresponding vertical coordinates. The line clustering component 122 can select a first subset of the ordered set of word fragments with strictly increasing vertical coordinates. The line clustering component 122 can update the ordered set of word fragments by removing already selected word fragments, and generating the next column in the same way as the previous one. The line clustering component 122 can keep generating the columns until all the word fragments in the ordered set are selected.

The method 500 can include the line clustering component 122 selecting a pair of columns (ACT 504), and determining vertical distances between pairs of word fragments associated with the selected pair for columns (ACT 506). The line clustering component 122 can, for example, order the columns according to the order according to which they were generated and select a pair of adjacent (or consecutive) columns. For example, referring to the columns 402-426 of FIG. 4, the line clustering component 122 can select columns 402 and 404. Adjacent (or consecutive) columns can include word fragments that are adjacent to each other in text lines of the input image. For example, considering the columns 402 and 404 of FIG. 4, the word fragments (or words) "save" and "money" are horizontally adjacent to each other (in a single text line) in the receipt image 202 of FIG. 2, and the same applies to the word fragments (or words) "ST" and "#."

The line clustering component 122 can determine the vertical distances between word fragments associated with distinct columns of the selected pair for columns (ACT 506). The line clustering component 122 can compute the vertical distance between a given pair of word fragments as the absolute difference between the corresponding vertical coordinates provided by the OCR processor component 112. The line clustering component 122 can compute the vertical distance between each pair of word fragments including a first word fragment in one column and another word fragment in the other column. The line clustering component 122 can compute the vertical distances for a subset of the pairs of word fragments including a first word fragment in one column and another word fragment in the other column.

FIG. 5B shows a table 520 depicting the vertical distances between word fragments associated with the first two columns of FIG. 4. Specifically, the table 520 depicts the vertical distances between pairs of word fragments associated with the columns 402 and 404. The cells in gray of the table 520 are associated with vertical distances that are equal to zero. A zero vertical distance between two word fragments can indicate that the two word fragments are aligned along the same vertical level in the input image (e.g., receipt image 202). The unit of the vertical distances shown in table 520 is the distance between two consecutive text lines in the input image. Specifically a vertical distance equal to one in table 520 can represent the distance d between two consecutive text lines in the input image. In some implementations, the vertical distances can be expressed in terms of pixels of the input image or other units of distance (or image distance).

While the vertical distance values shown in table 520 are integer values (e.g., representing multiples of d), in general, vertical distances between word fragments can be equal to non-integer fractions of d. Specifically, word fragments may not appear (at least to the OCR processor component 112) to be perfectly aligned along horizontal text lines (or vertical levels) due to, for example, misalignment of the receipt (or other document) relative to the scanner or the camera during the scanning or imaging process, formatting of the receipt, or a combination thereof. In other words, the vertical distance between two word fragments can be equal to, for example, 0.2 d, 1.3 d, 4.8 d, or other non-integer multiple of the distance d representing the distance between two consecutive text lines in the input image.

The method can include the line clustering component 122 merging the selected pair of columns into a single column based on the vertical distances (ACT 508). Referring to FIGS. 1-5B, the line clustering component 122 can map word fragments in the first column of the selected pair of columns to word fragments in the second column of the selected pair of columns based on the vertical distances between corresponding pairs of word fragments. For instance, the line clustering component 122 can map a first word fragment in the first column to a second word fragment in the second column if the vertical distance between both words is equal to zero or less than a predetermined threshold distance (e.g., less than 0.5). If there is no word in the second column that is within a vertical distance less than or equal to the predetermined threshold distance from the first word, then the line clustering component 122 won't map the first word to any word in the second column. When word fragments (or words) from different columns are mapped to each other, these word fragments (or words) can be viewed as belonging to the same vertical level or the same text line in the input image (e.g., receipt image 202 of FIG. 2). The line clustering component 122 can merge the selected pair of columns into a single new column based on the mappings of word fragments in one column to other word fragments in the other column. The line clustering component 122 can assign word fragments, from two different columns, which are mapped to each other to the same entry in the new column. For example, considering the columns 402 and 404 of FIG. 4 and the corresponding vertical distances in table 520 of FIG. 5B, the line clustering component 122 can merge columns 402 and 404 into a new column having both word fragments "save" and "money" in the first entry, the pair of word fragments "ST" and "#" in the second entry, the pair of word fragments "EXCHANGE" and "SLIP" in the third entry, and so on and so forth. In other words, each pair of word fragments having a vertical distance equal to zero is allocated a single corresponding entry in the new column. The line clustering component 122 can then update the set of columns by replacing the selected pair of columns with the new column.

In the example depicted in FIG. 5B, there is a one-to-one mapping between the word fragments in the column 402 and the word fragments in the column 404. However, that may not be always the case. For example, a word fragment (or word) in one column may not be mapped to any other word fragment (or word) in another column. Also, the vertical distances, whether expressed in pixels or in terms of distance between pairs of consecutive text lines in the input image, may not always be equal to integer multiples of the distance between pairs of consecutive text lines in the input image. For instance, word fragments associated with the same text line in the input image or the original document (e.g., receipt) may be separated from each other by vertical distances that are greater than zero due to, for example, misalignment of the original document when scanned (or imaged), vertical distance errors made by the OCR processor component 112, or a combination thereof. These factors can make the merging of the columns based on vertical distances between word fragments more challenging and less accurate.

The line clustering component 122 can apply the Needleman-Wunsch alignment approach (or algorithm) in merging the selected pair of columns. When applying the Needleman-Wunsch alignment approach, the line clustering component 122 can assign, for each pair of word fragments from both of the selected pair of columns, a respective first cost for mapping the pair of word fragments to each other. For example, the respective first cost can be equal to the vertical distance between the pair of word fragments. As the vertical distance between the pair of word fragments increases, the respective first cost of mapping the word fragments to each other also increases. The line clustering component 122 can also assign, for each word fragment in one column of the selected pair of columns, a respective second cost for not mapping that word fragment to any other word fragment in the other column of the selected pair of columns. The second cost can be, for example, constant for all word fragments. The second cost can vary, for example, with the corresponding word fragment, the corresponding column, or a combination thereof. The line clustering component 122 can use the first and second costs to determine a set of mappings between word fragments across the selected pair of columns with a minimum total cost. The line clustering component 122 can assign the first and second costs differently such that the total cost is to be maximized (instead of minimized) when determining the set of mappings between word fragments across the selected pair of columns. For example, the respective first cost for a given pair of word fragments can be equal to the negative of the vertical distance between that pair of word fragments, and the respective second cost for each word fragment can be equal to a negative constant.

FIG. 6A shows a table 602 depicting vertical distances between word fragments in column 408 and word fragments in column 410. The word fragments in these columns and the corresponding vertical distances are used to illustrate an example merging of the columns 408 and 410 using the Needleman-Wunsch alignment approach.

Figure 6B:
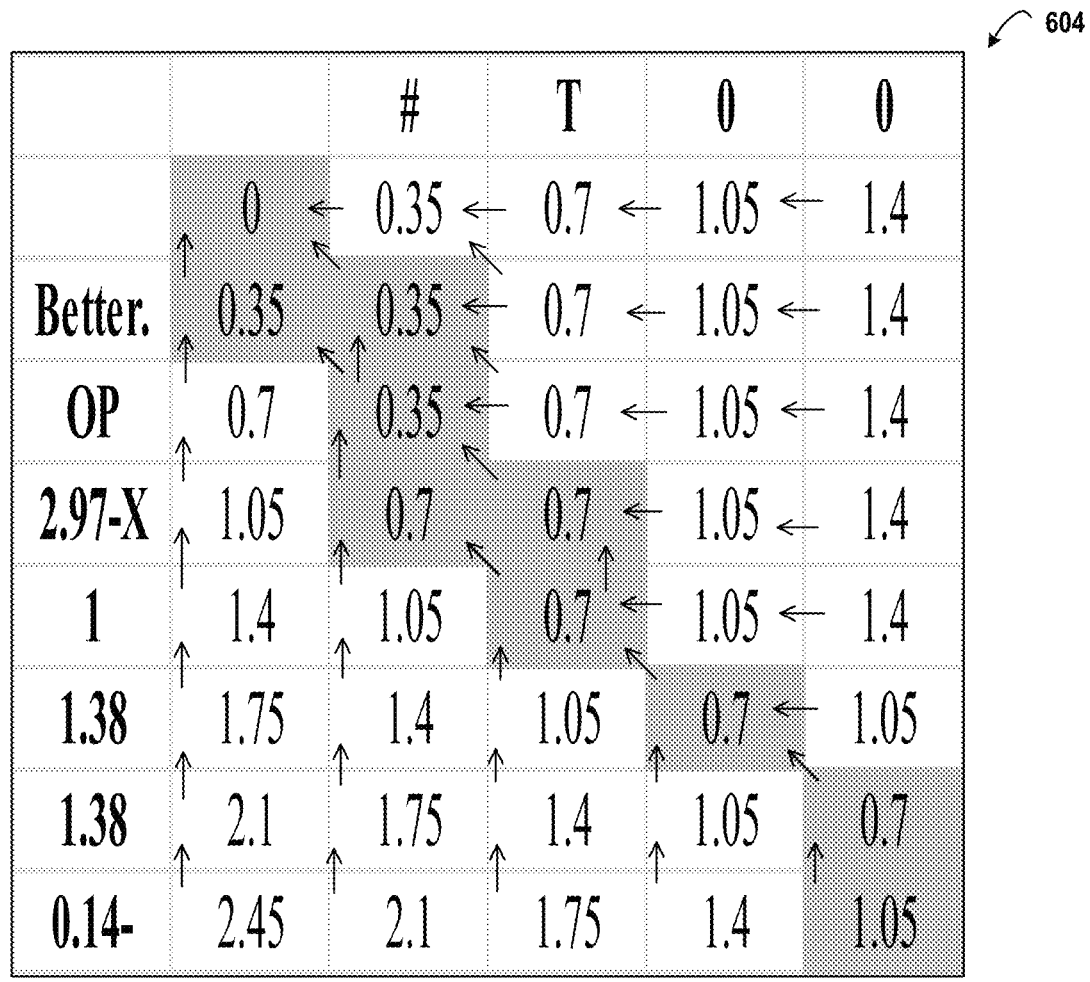
FIG. 6B shows a cost matrix depicting costs of aligning word fragments of one column with word fragments of another column according to the Needleman-Wunsch alignment approach.

FIG. 6B shows a cost matrix 604 depicting costs of aligning word fragments of one column with word fragments of another column according to the Needleman-Wunsch alignment approach. When using the Needleman-Wunsch alignment approach, for example, to merge columns 408 and 410, the line clustering component 122 can generate the matrix 604 based on the vertical distances (or first costs) shown in FIG. 6A and a constant second cost equal to 0.35 for not aligning a word fragment in one column with any other word fragment in the other column. In some embodiments, the second cost (of not aligning a word fragment in one column with any other word fragment in the other column) can be defined differently (e.g., equal to another constant value or defined to vary for each word fragment).

The first column of cost matrix 604 can include the word fragments of column 408 and the first row of cost matrix 604 can include the word fragments of column 410. The second column of cost matrix 604 can include the cost of not aligning any of the word fragments of column 408 with any of the word fragments in column 410 starting with a zero cost at cell (2,2) in the cost matrix 604. The cost of not aligning the word fragment "Better." to any other word fragment in column 410 is 0.35. If the word fragment "OP" is not aligned to any word fragment in column 410, then the cost becomes 07 (0.35+0.35). As the next word fragment (e.g., "2.97-X") is not aligned with any word fragment in column 410, the cost increases by 0.35 so that the cost for not aligning any of the seven word fragments of column 408 with any of the word fragments of column 410 is 2.45 as shown in cell (9,2). The second row of cost matrix 604 shows the costs of not aligning any of the word fragments of column 410 to any word fragment in column 408. The costs shown in the second row increase by 0.35 from one cell to the next. The cost matrix 604 can include a plurality of arrows. Each arrow can start at a respective first cell and point to a respective second cell that is a neighbor of the first cell. The second cell to which the arrow points can represent the cell used to compute the cost at the first cell. For example, the arrow between the cells (2,4) and (2,3) can indicate that the cost at cell (2,4) corresponding to word fragment "T" is computed using the cost 0.35 at cell (2,3) incremented by 0.35 for not aligning the word fragment "T" with any word fragment in column 408. The same applies, for example, to the other arrows associated with other pairs of cells of cost matrix 604.

After filling in the costs for the second row and the second column of cost matrix 604, the line clustering component 122 can determine and fill in the cost for the other cells starting from the top left, e.g., cell (3,3). For each cell, the line clustering component 122 can determine the smallest cumulative cost based on the vertical distances (also referred to herein as first costs) associated with the corresponding word fragments, the cost of not aligning the corresponding word fragments with other word fragments (also referred to herein as second costs), and the neighboring cell with the minimum cost. For example, for the cell (3,3), the vertical distance between the word fragments "Better." and "#" (or the first cost for aligning these word fragments with each other) is 5, however, the cost of not aligning each of them to other word fragments is 0.35. Also, the neighboring cell with the smallest already assigned cost is the cell (2,2) which has a cost 0. Accordingly, the line clustering component 122 can assign a cost of 0.35 (0.35+0) to the cell (3,3), and maintain an indication that the cell (2,2) was used to compute or determine the cost of cell (3,3). Such indication is represented by the arrow pointing to the cell (2,2) from the cell (3,3). The line clustering component 122 can then determine and fill in the cost for the cell (3,4). Since the vertical distance between the word fragments "Better." and "T" is 9 (larger than 0.35), as shown in FIG. 6A, the line clustering component 122 can assign a cost of 0.35 plus the smallest already assigned cost for neighboring cells. In this case, two neighboring cells (2,3) and (3,3) have a minimum cost of 0.35. Hence, the line clustering component 122 can assign the cost 0.7 (0.35+0.35) to the cell (3,4), and maintain indications that the cost of cell (3,4) was computed based on cell (2,3) or cell (3,3). Such indications are shown via the two arrows pointing from cell (3,4) to cells (2,3) and (3,3), respectively. The line clustering component 122 can also determine the cost for the cell (4,3) as 0.35 since the vertical distance between the word fragments "OP" and "#" is zero and the smallest cost associated with neighboring cells is 0.35 (neighboring cell (3,3)). The line clustering component 122 can fill in the cell (4,3) with the cost 0.35 and maintain an indication that the cost of this cell is computed using the cost of the cell (3,3). Such indication is represented via the arrow pointing from cell (4,3) to cell (3,3) in FIG. 6B. The line clustering component 122 can continue determining and filling in costs for the rest of the cells of the cost matrix 604 in the same way until all the cells in the cost matrix 604 are filled with the corresponding costs and the indications (arrows in FIG. 6B) for various cells with regard to the neighboring cell(s) used in determining the costs are maintained.

Once the cost matrix 604 is constructed completely, the line clustering component 122 can determine a least cost path from the most bottom right cell (e.g., cell (9,6)) to the most top left cell (e.g., cell (2,2)) of the cost matrix 604. In determining the least cost path in the cost matrix 604, the line clustering component 122 can start from the most bottom right cell and use the indications (or arrows shown in FIG. 6B) neighboring cell(s) used to determine the cost of each cell in the cost matrix 604. The least cost path in cost matrix 604 is shown in gray in FIG. 6B. The arrow (or indication) associated with cell (9,6) points to cell (8,6) with a difference between corresponding costs equal to 0.35 (1.05–0.7), which is the cost of not aligning a word fragment in one column to any other word fragment in the other column. The line clustering component 122 can deduce that at least one of the word fragments "0.14-" and "0" associated with cell (9,6) is not to be aligned with any other word fragment from the other column. The arrow (or indication) associated with cell (8,6) points to cell (7,5) with a difference between corresponding costs equal to 0 (0.7–0.7), which is the vertical distance between word fragments "1.38" and "0" associated with cell (8,6). The line clustering component 122 can deduce based on the cost difference being equal to the vertical distance between the word fragments "1.38" and "0" that these word fragments are to be aligned with each other and that the word fragment "0.14-" is not to be aligned with any other word fragment from column 410. The arrow (or indication) associated with cell (7,5) points to cell (6,4) with a difference between corresponding costs equal to 0 (0.7–0.7), which is the vertical distance between word fragments "1.38" and "0" associated with cell (7,5). The line clustering component 122 can deduce that these word fragments associated with cell (7,5) are to be aligned with each other. The arrow (or indication) associated with cell (6,4) points to both cells (5,4) and (5,3) with a difference between corresponding costs equal to 0 (0.7–0.7), which is the vertical distance between word fragments "1" and "T" associated with cell (6,4). The line clustering component 122 can deduce that the word fragments "1" and "T" are to be aligned with each other. The arrows associated with both cells (5,4) and (5,3) point to cell (4,3) with difference between the costs in the cells (5,4) and (5,3) and the cost in cell (4,3) being equal to 0.35, therefore, implying that the word fragment "2.97-X" associated with both cells (5,4) and (5,3) is not to be aligned with any other word fragment in column 410. Continuing with the least cost path, two arrows are associated with the cell (4,3) and they point to cells (3,3) and (3,2) respectively. The difference between the cost of the cell (4,3) and the cost of each of the cells (3,3) and (3,2) is equal to zero implying that the word fragments "OP" and "#" are to be aligned with each other. Finally, the arrows (or indications) associated with both cells (3,3) and (3,2) both point to the cell (2,2), which a cots difference equal to 0.35 between the former two cells and the latter cell. The cost difference implies that the word fragment "Better." associated with cells (3,3) and (3,2) is not to be aligned with any other word fragment in column 410.

Figure 6C:
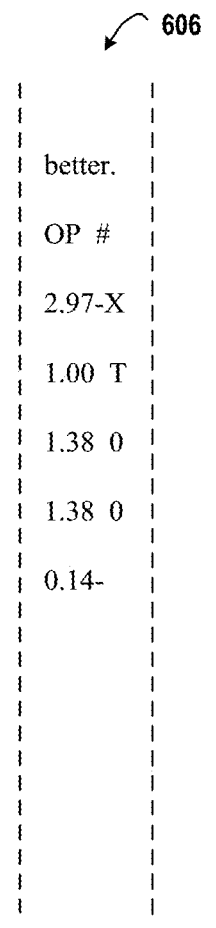

Considering the determined alignments between the word fragments in column 408 and the word fragments in column 410, the line clustering component can merge these columns to form the new column 606 shown in FIG. 6C. In the new column 606, the first entry includes only the word fragment "Better.," the second entry includes the word fragments "OP" and "#," the third entry includes the word fragment "2.97-X," the fourth includes the word fragments "1" and "T," the fifth entry includes the word fragments "1.38" and "0," the sixth entry includes the word fragments "1.38" and "0," and the last entry includes the word fragment "0.14-." The line clustering component 122 can insert word fragments in the selected pair of columns (e.g., columns 408 and 410) that are found to be aligned (based on corresponding vertical coordinates) in the same entry in the new column e.g., column 606) representing a merging of the selected pair of columns. For example, the word fragments "OP" and "#" which are found to be aligned (based on respective vertical coordinates) are both in the second entry of column 606. Also, both word fragments "1.00" and "T" which are found to be aligned (based on respective vertical coordinates) occupy the fourth entry of column 606. The same applies to the pairs of word fragments in the fifth and sixth entries of column 606. The line clustering component 122 can replace the selected pair of columns (e.g., columns 408 and 410) in the set of columns (e.g., the set of columns 402-426 shown in FIG. 4) with the new column (e.g., 606).

Referring back to FIG. 5A, the method 500 can include checking the number of columns in the set of columns and repeating ACTS 504-508 until there is only one single column remaining (ACT 512). At DECISION BLOCK 510, the line clustering component 122 can check whether the remaining number of columns in the updated set of columns (or after replacing the selected pair of columns with the new column representing a merger of the pair of selected columns) is greater than one. If the number of remaining columns is greater than one, the line clustering component can loop back to ACT 504 to select a new pair of columns from the updated set of columns, determine vertical distances between word fragments of the new selected pair of columns (ACT 506) and merge the new selected pair of columns (ACT 508). The line clustering component can perform the ACTs 504, 506 and 508 as discussed above. The line clustering component 122 can keep looping back from DECISION BLOCK 510 to ACT 504 until there is only one single column left after the repeated merging of selected pairs of columns. During each loop (ACT 504-508), the line clustering component can select two adjacent columns and merge them based on the vertical distances between corresponding word fragments. When merging a selected pair of columns, the line clustering component can preserve the horizontal distance (e.g., recorded by the OCR processor component 112) between any pair of adjacent word fragments that are found to be aligned and are entered in the same entry of the new column representing the merger of a selected pair of columns. For example, when constructing the column 606 of FIG. 6C, the line clustering component 122 can maintain horizontal distances between the pairs of word fragments in the corresponding second, fourth, fifth, and sixth entries. In some implementations, the line clustering component 122 may not preserve horizontal spacing between adjacent and aligned word fragments when merging a pair of columns into a single new column, but may maintain horizontal distances between various word fragments, for example, in a data structure.

FIG. 6D shows an example final column 608 obtained by repeatedly merging pairs of columns in the set of columns 400 shown in FIG. 4. Each entry of the final column 608 can include a corresponding cluster of word fragments that are found to be aligned based on their vertical coordinates (or vertical distances between them). In each entry of the final column 608, the horizontal spacing between word fragments in that entry may reflect the horizontal spacing between the same word fragments recorded by the OCR processor component 112 when processing the input image (e.g., receipt image 202 shown in FIG. 2). In some implementations, the horizontal spacing between horizontally adjacent word fragments (word fragments sharing the same entry of final column 608) may not reflect the horizontal spacing between the same word fragments recorded by the OCR processor component 112.

Referring back to FIG. 3, the method 300 can include the line clustering component 122 assigning word fragments in each word fragment cluster to a corresponding text line (ACT 308). The line clustering component can define each set of word fragments found to be (based on vertical distances between them or based on corresponding vertical coordinates) horizontally aligned as a separate text line. For instance, the line clustering component 122 can assign the word fragments in each entry of the final column (e.g., column 608 in FIG. 6D) to a separate text line. Each entry of the final column can represent a respective text line of the input image 202 (or in the corresponding output 204) in FIG. 2.

Figure 7:
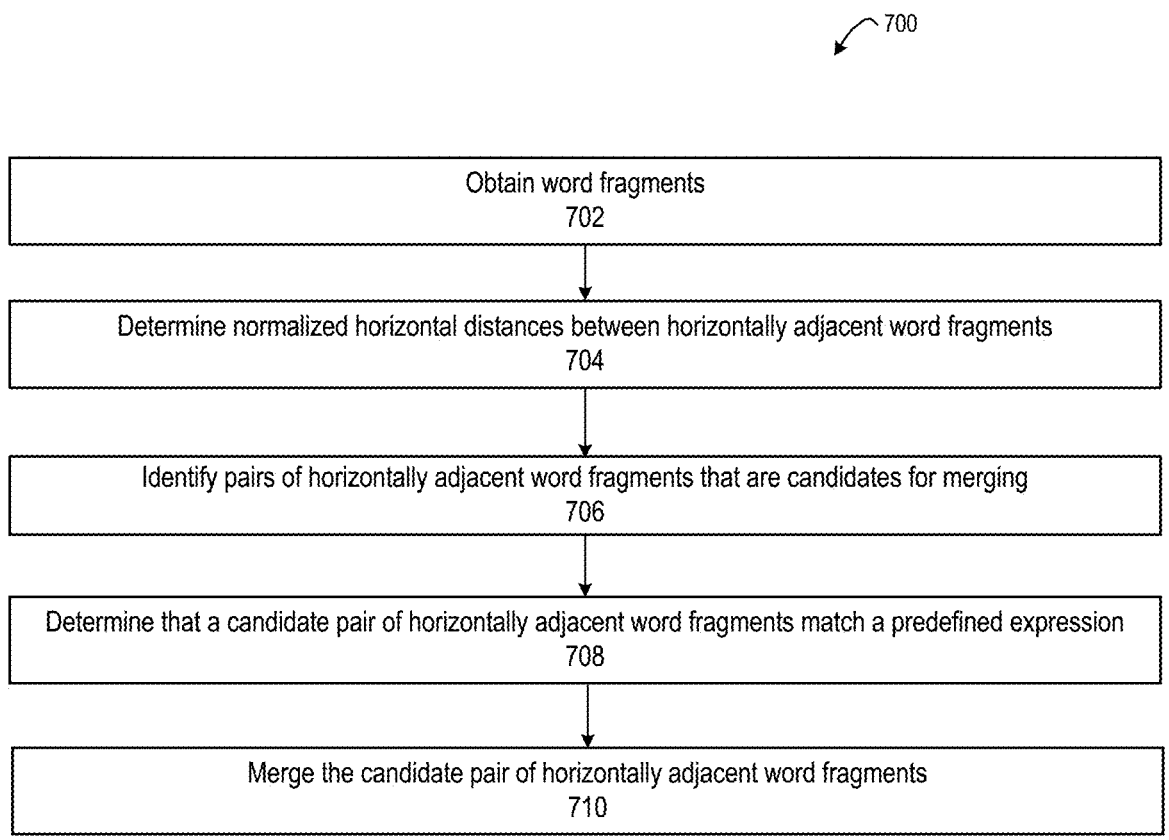
FIG. 7 shows a flow diagram illustrating a method of merging horizontally adjacent word fragments in outputs OCR systems.

FIG. 7 shows a flow diagram illustrating a method 700 of merging horizontally adjacent word fragments in outputs OCR systems. The method 700 can be performed by the word merging component 124 (or the OCR post-processing component 114). The method 700 can include obtaining a plurality of word fragments from OCR generated data (ACT 702). Each word fragment of the plurality of word fragments can be associated with a respective text line of one or more text lines. The method 700 can include determining, for each pair of horizontally adjacent word fragments in a text line of the one or more text lines, a respective normalized horizontal distance between the pair of adjacent word fragments (ACT 704). The method 700 can include identifying, in the text line of the one or more text lines, one or more pairs of horizontally adjacent word fragments that are candidates for merging based on the normalized horizontal distances (ACT 706). The method 700 can include determining that a pair of horizontally adjacent word fragments, among the one or more pairs of adjacent word fragments that are candidates for merging, matches a predefined expression of a plurality of predefined expressions (ACT 708). The method 700 can include merging the pair of adjacent word fragments that matches the predefined expression into a single word, responsive to determining that the pair of adjacent word fragments matches the predefined expression (ACT 710). As used herein, word fragments can include a portion of a word, a complete word, a single character word, or a combination thereof.

Referring to FIGS. 1 and 7, the method 700 can include the word merging component 124 obtaining a plurality of word fragments from OCR generated (or extracted) data (ACT 702). The OCR generated data can include a document, a data structure, or a combination thereof including the plurality of word fragments. The plurality of word fragments can be generated or extracted by the OCR processor component 112 from an input image. The input image can include a receipt image, such as the receipt image 202 shown in FIG. 2. The plurality of word fragments can be arranged into one or more clusters of horizontally aligned word fragments with each cluster of horizontally aligned word fragments representing a respective text line. Accordingly, each word fragment of the plurality of word fragments can be associated with a respective text line of one or more text lines. For example, the plurality of word fragments can be arranged as depicted in FIG. 6D. The word merging component 124 can obtain the plurality of word fragments from the OCR processor component 112, the line clustering component 122, other component of the OCR post processing component 114, or other component of the data processing system 102.

The word merging component 125 may obtain the word fragments one text line (or one cluster of horizontally aligned word fragments) at a time. For example, considering the word fragments' arrangement depicted in FIG. 6D, the word merging component 124 can obtain (or retrieve from a memory location) the word fragments one column entry at a time. The word merging component 124 may obtain all the word fragments in the OCR generated data at once. For example, the word merging component 124 can obtain (or receive) a document or a data structure including all the word fragments.

The method 700 can include the word merging component 124 determining, for each pair of horizontally adjacent word fragments in a text line of the one or more text lines, a respective normalized horizontal distance between the pair of horizontally adjacent word fragments (ACT 704). For instance, the OCR generated data may include the plurality of word fragments, lengths of gaps between pairs of horizontally adjacent word fragments, vertical coordinates of the word fragments, or a combination thereof. For example, the OCR processor component 112 can determine the lengths of gaps between horizontally adjacent word fragments when processing the input image, and output such lengths (or distances) with the word fragments. The word merging component 124 can retrieve the length of the gap between each pair of horizontally adjacent word fragments in the text line from the OCR generated data. The lengths of gaps can be expressed in terms of pixels or other unit of distance (e.g., unit of image distance). The length of a gap (or horizontal distance) between a pair of adjacent word fragments can be determined as the difference between the horizontal coordinate (or x-coordinates) of leftmost point of the right word fragment and x-coordinate of the rightmost point of the left word fragment.

The word merging component 124 can also obtain a dimension (e.g., width) of the input image (e.g., receipt image 202). The OCR processor component 112 can determine and/or provide the dimension of the input image. The word merging component 124 can determine (or compute) the normalized distance between each pair of adjacent word fragments as the length of the gap between that pair of word fragments divided by the dimension of the input image (e.g., width of the receipt image 202). Since receipts (or other documents) can come in various shapes sizes, or formats, using normalized distances between adjacent word fragments (e.g., instead of actual distances or the lengths of the gaps) provides a more robust and reliable measure of spaces between the adjacent word fragments, for example, to determine whether such spaces correspond to original spacing between adjacent words in the original document (e.g., receipt) or correspond to false spacing introduced by the OCR processor component 112. For example, the smaller the width of a receipt is, the smaller can be the font length associated with text in the receipt and the smaller can be the spacing between adjacent words in the receipt.

The dimension of the input image can be expressed, for example, in terms of pixels or other unit of distance (or image distance). The dimension of the input image (or receipt image) can include the width of the input image (e.g., expressed as number of pixels). The dimension of the input image (or receipt image) can include the width of a text segment in the input image (or receipt image). For example, the width of the text segment can represent the width of the input image minus the widths of the left and right margins in the input image. The width of the text segment can represent the width of text in the longest text line in the input image.

The method 700 can include the word merging component 124 identifying, in the text line of the one or more text lines, one or more pairs of horizontally adjacent word fragments that are candidates for merging based on the normalized horizontal distances (ACT 706). The word merging component 124 can identify each pair of adjacent word fragments (associated with the text line) with a relatively small corresponding normalized distance as a candidate pair of word fragments for merging into a single word. For example, the word merging component 124 can compare, for each pair of adjacent word fragments in the text line, the respective normalized horizontal distance between the pair of adjacent word fragments to a threshold value. The threshold value can be defined, for example, to be equal to a normalized width (e.g., divided by the dimension of the input image) of a character in the input image (or in the text line) or to a fraction thereof. The threshold value may be equal to an average normalized width of characters in the input image (e.g., receipt image 202 shown in FIG. 2) or in the text line. As text in the input image may be associated with various text fonts or font sizes, the word merging component 124 can use different threshold values for pairs of adjacent word fragments associated with distinct text fonts or distinct font sizes. The threshold value can be defined as a percentage or a fraction (e.g., 1%, 2%, or other percentage or fraction) of the dimension of the input image.

Upon determining that the normalized distance is smaller than or equal to the threshold value, the word merging component 124 can identify the corresponding pair of adjacent word fragments as a candidate pair for merging. In other words, the fact that the normalized distance is smaller than or equal to the threshold value can be indicative that the gap or spacing between the corresponding pair of adjacent word fragments is small enough and may possibly be a false spacing introduced by the OCR processor component 112. However, the fact that the normalized distance is greater than the threshold value can be indicative that the gap or spacing between the corresponding pair of adjacent word fragments is too large to possibly be a false spacing introduced by the OCR processor component 112. As such, a pair of word fragments with a corresponding normalized distance greater than the threshold value cannot be a candidate for merging.

Figure 8:
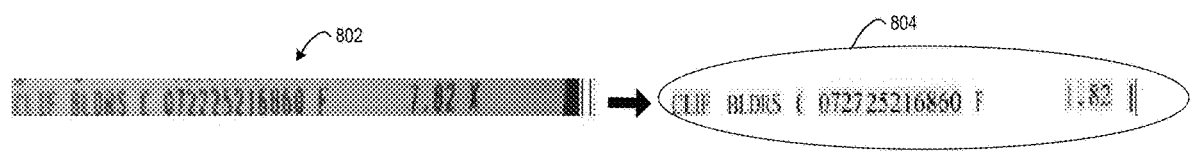
FIG. 8 shows an image of a text a line from a receipt and corresponding recognized text.

Referring to FIG. 8, an image 802 of a text a line from a receipt and corresponding recognized (e.g., by OCR processor component 112) text 804 are shown. Considering the text 804, the adjacent word fragments "CLIF" and "BLDRS" are too far apart to be merged with each other. The same applies to the pair of adjacent word fragments "BLDRS" and "(" or the pair of adjacent word fragments "(" and "0727." However, the pair of adjacent word fragments "0727" and "25216860" are close enough to each other to be eligible or candidate for merging into a single word. The same applies to the pair of adjacent word fragments "1" and "." and the pair of adjacent word fragments "." and "82." Accordingly, the word merging component 124 may consider the pairs of adjacent word fragments "0727" and "25216860," "1" and "." or "." and "82" for merging, but may not consider the pairs "CLIF" and "BLDRS," "BLDRS" and "(" or "F" and "1." The use of normalized horizontal distances in determining which of adjacent word fragments can be candidates for merging allows for a robust criterion as the size of the image (or receipt), the size of characters therein or the size of horizontal spacing between consecutive or adjacent words vary.

Referring back to FIG. 7, the method 700 can include the word merging component 124 determining that a pair of horizontally adjacent word fragments, among the one or more pairs of adjacent word fragments that are candidates for merging, matches a predefined expression of a plurality of predefined expressions (ACT 708). The plurality of predefined expressions can represent formats, structures, or patterns of words that typically or likely appear in the input image. For example, the plurality of predefined expressions can represent words commonly used in receipts, such as price values or item codes or identifications (IDs). The plurality of predefined expressions can include a predefined expression representing a pattern of price values, such as the pattern \d+[.]\d{2} including a digit followed by "." which is also followed by two digits. Another price pattern can be \d{2}+[.]\d{2}. The plurality of predefined expressions can include a predefined expression representing a pattern of item IDs (or codes), such as the pattern \d{12} including 12 digits. Other example predefined expressions or word patterns can be defined based on, for example, data collected from various receipts or document types. For example, the data processing system 102 can maintain, for each business or retailer, a separate set of predefined expressions (or word patterns) specific to that business or retailer. The OCR post-processing component 114 or the word merging component can identify the business or retailer associated with a receipt image (e.g., receipt image 202) based on output data (e.g., text output) provided by the OCR processor component 112, and retrieve the set of predefined expressions specific to that business or retailer.

The word merging component 124 can use the predefined expressions (or word patterns) to determine whether or not to merge a pair of adjacent word fragments. The word merging component 124 can slide a predefined expression (or word pattern) across word fragments in a line text to identify a pair of (or more than two) consecutive or adjacent word fragments that match the predefined expression. The word merging component 124 may ignore spaces between adjacent word fragments in the text line when checking for matches to the predefined expression (or word pattern). Exhaustive sliding and comparing of the predefined expression to adjacent word fragments in the text line can be time consuming, inefficient in terms of power consumption, and may lead matching errors, for example, by matching the predefined expression to adjacent word fragments that are far apart from each other.

The word processing component can consider only pairs of adjacent word fragments that are identified as candidates for merging when sliding the predefined expression across the line text and comparing it to word fragments therein. For example, considering the recognized text 804 in FIG. 8 and the predefined expression (or word pattern) \d{12}, the word merging component 12 can slide this word pattern across only the pairs of adjacent word fragments "0727" and "25216860," "1" and "." or "." and "82" which are identified (e.g., in ACT 706) as candidates for merging. However, the word merging component 12 may not slide the word pattern across other pairs of adjacent word fragments in the text line 804 which are not identified as candidates for merging. The word merging component 124 can determine a match between the word pattern \d{12} and the pair of adjacent word fragments "0727" and "25216860."

The word merging component 124 can also slide and compare the word pattern (or predefined expression) \d+[.]\d{2} against the pairs of adjacent word fragments in the text line 804 that are identified as candidates for merging. The word merging component 124 can determine that the pair of adjacent word fragments "1" and "." matches a portion of the word pattern and the pair of adjacent word fragments "." and "82" matches a second portion of the word pattern. Specifically, the word merging component 124 can determine that the three consecutive (or adjacent) word fragments "1," "." and "82" (which form two consecutive pairs that are candidates for merging) match the word pattern \d+[.]\d{2}. In general, the word merging component 124 can match a word pattern to two or more consecutive (or adjacent) word fragments that candidates for merging (e.g., with normalized distance between any pair of adjacent word fragments therein less than or equal to the threshold value).

The method 700 can include the word merging component merging the pair of adjacent word fragments that matches the predefined expression into a single word, responsive to determining that the pair of adjacent word fragments matches the predefined expression (ACT 710). For example, responsive to the matching determined between the word pattern \d{12} and the pair of adjacent word fragments "0727" and "25216860," the word merging component 124 can merge the word fragments "0727" and "25216860" into the single word "072725216860" and update the text line 804 accordingly. Also, responsive to the matching determined between the word pattern \d+[.]\d{2} and the consecutive (or adjacent) word fragments "1," "." and "82," the word merging component 124 can merge these word fragments into the word "1.82" and update (or modify) the line text 804 accordingly.

The word merging component 124 can repeat the operations in ACTS 804 through 810 with all text lines, and update the corresponding text whenever a merging of two or more word fragments is performed. The correction of word segmentation (e.g., by merging mistakenly split word fragments) by the word merging component 124 can improve the accuracy of final text (e.g., text output by the word merging component) and allow for accurate automatic interpretation of such final text.

The assignment of word fragments to text lines by the line clustering component 122 and the merging of wrongly split word fragments by the word merging component both allow for improving the accuracy OCR-based textual output. Such improvement can allow for automatic processing of receipts and accurate automatic interpretation of information therein. For example, accurate line clustering of word fragments allow for mapping item codes or item names in receipts to corresponding quantity values or corresponding price values. Also, correcting for false word splitting allows for accurate identification and retrieval of relevant information (e.g., item codes, item names quantity values, or price values) from receipt images.

Figure 9:
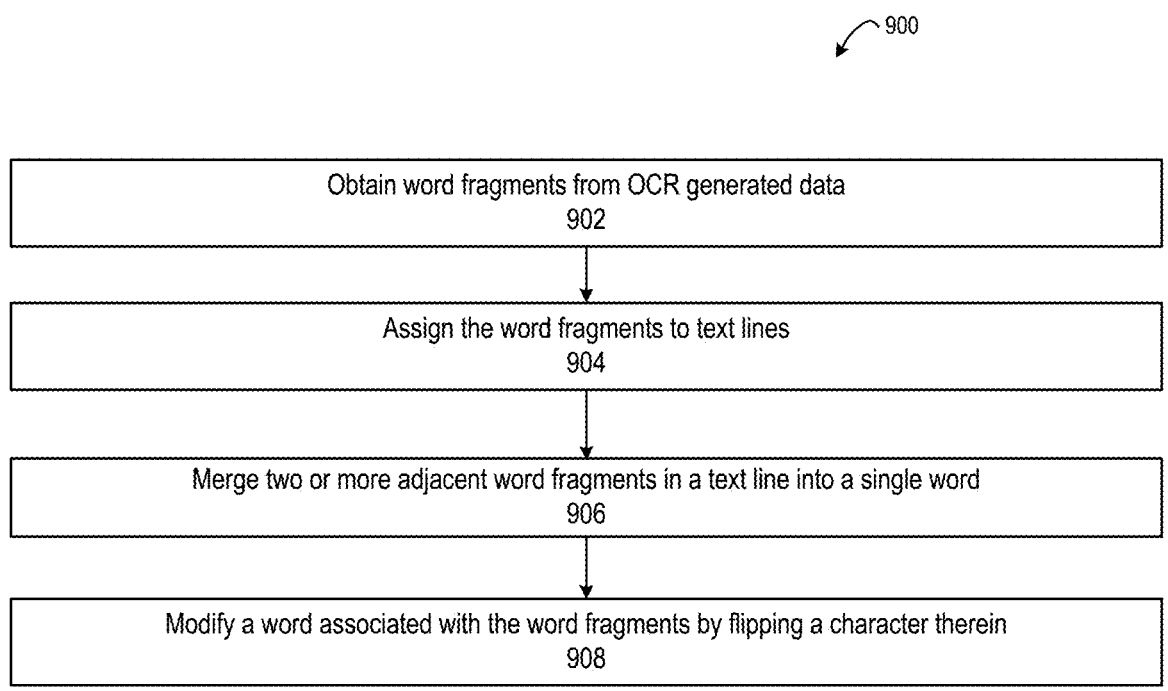
FIG. 9 shows a flow chart illustrating a method of post-processing OCR-based textual output.

FIG. 9 shows a flow chart illustrating a method 900 of post-processing OCR-based textual output. The method 900 can include word fragments associated with OCR generated data (ACT 902). The method 900 can include assigning the word fragments to text lines based on vertical coordinates of the word fragments (ACT 904). The method 900 can include merging a pair of adjacent word fragments in text line (ACT 906). The method 900 can include modifying a word associated with the word fragments by flipping a respective character (ACT 908).

The method 900 can include the OCR post-processing component 114 obtaining word fragments associated with OCR generated data. The OCR processor component 112 can generate the OCR generated (or extracted) data by processing an input image including text (e.g., receipt image 202 of FIG. 2). As discussed with regard to FIGS. 1 and 3, (e.g., with regard to ACT 302 of FIG. 3), the OCR generated data can include a plurality of word fragments, vertical coordinates of the word fragments in the input image, horizontal distances between horizontally adjacent word fragments, or a combination thereof. The OCR generated data can be provided in one or more documents or files, one or more data structures, or a combination thereof. The OCR post-processing component 114 can obtain the OCR generated data from the OCR processor component 112 or from a memory location.

The method 900 can include the line clustering component 122 assigning each word fragment to a respective text line as discussed above with regard to FIGS. 2 through 6D. In assigning word fragments to text lines, the line clustering component 122 can arrange the word fragments into a plurality of text lines, for example, as illustrated in FIG. 6D.

The method 900 can include the word merging component 124 merging two or more consecutive (or adjacent) word fragments within a text line. After the line clustering component 122 arranges the word fragments into a plurality of text lines, the word merging component 124 can process the text lines output by the line clustering component 122, and merge consecutive (or adjacent) word fragments within each text line based on corresponding normalized horizontal distances separating adjacent word fragments, as discussed above with regard to FIGS. 7 and 8.

The method 900 can include the character flipping component 126 modifying (or adjusting) at least one word associated with the word fragments by flipping one or more respective characters. The character flipping component 126 can receive or access textual output provided by the word merger component 124. In the textual output provided by the word merger component 124, word fragments can be referred to as words since falsely split word fragment are presumably merged by the word merger component 124. The character flipping component 126 can identify words that are potentially erroneous. For example, the character flipping component 126 (or the post-processing component 114) can compare a word (e.g., an item ID or item name) to a vocabulary list. If the no match is found in the vocabulary list, the character flipping component 126 (or the post-processing component 114) can identify the word as potentially erroneous. Once a word is identified as potentially erroneous, the character flipping component 126 can identify characters in that word that are associated with relatively high character error rate with respect to the performance of the OCR processor component 112. For example, the OCR processor component 112 may mistakenly confuse the characters "8," "3" and "B". The OCR processor component 112 may also mistakenly confuse the characters "o" and "0" or the characters "1" and "I." Accordingly, these characters may be associated with higher character error rate than other characters. If the character flipping component 126 identifies a character that is associated with relatively high character error rate in the potentially erroneous word, the character flipping component 126 can flip that character with another character with which the first character is frequently confused. For example, the character flipping component 126 can flip "o" with "0" or vice versa, can flip "I" with "1" or vice versa, or can flip "8" with "3" or "B" or vice versa. The character flipping component 126 may compare the word again, after flipping the character, to the vocabulary list. The character flipping component 126 may flip more than one character in the word or may alternately flip different characters until the word matches another word in the vocabulary list. The character flipping component may repeat the character flipping process for all or a subset of the words in the textual output provided by the word merging component 124.

The data processing component 108 can use textual output provided by the OCR post-processing component 114 (e.g., after assigning word fragments to text lines, merging word fragments, modifying words by flipping respective characters, or a combination thereof) to update information maintained, for example, in a database. The data processing component 108 can use data associated with the textual output (or data associated with the receipt image) to update data related to, for example, ad conversion, product or service sales, user expenses, or combination thereof. For example, the data processing component 108 can use date and time information, product or service information (e.g., item ID and name, sold quantity, price, or a combination thereof), and/or seller information extracted from the output textual data (or text data associated with the receipt image) to identify an item purchased. The data processing component 102 can also use data indicative of a user device associated with the receipt (e.g., device ID of the device from which receipt image is received) to determine that an ad related to the purchased item was previously shown on that device. The data processing component 108 can determine (or detect) a conversion event based on the ad previously presented on the user device and the identified purchased item. The data processing component 108 can update data indicative of expenses associated with the user device (or the corresponding user) based on information extracted from the textual output data. The data processing component 108 may provide access to information extracted from the textual output data to a computing device 130 associated with an advertiser.

While method and processes performed by the OCR post-processing component 114 are described herein in relation with the data processing system 102, these methods and processes can be performed by computer system including a single computing device or a plurality of computing devices. The computer system can perform all the methods associated with OCR post-processing component or any combination thereof. For example, the computer system can perform the method(s) of assigning word fragments to text lines (e.g., as described with regard to FIGS. 3 through 6D), the method(s) of merging adjacent word fragments (e.g., as discussed with regard to FIGS. 7 and 8), the method(s) of modifying words by flipping characters (e.g., as discussed with regard to FIG. 9), or any combination thereof.

Figure 10:
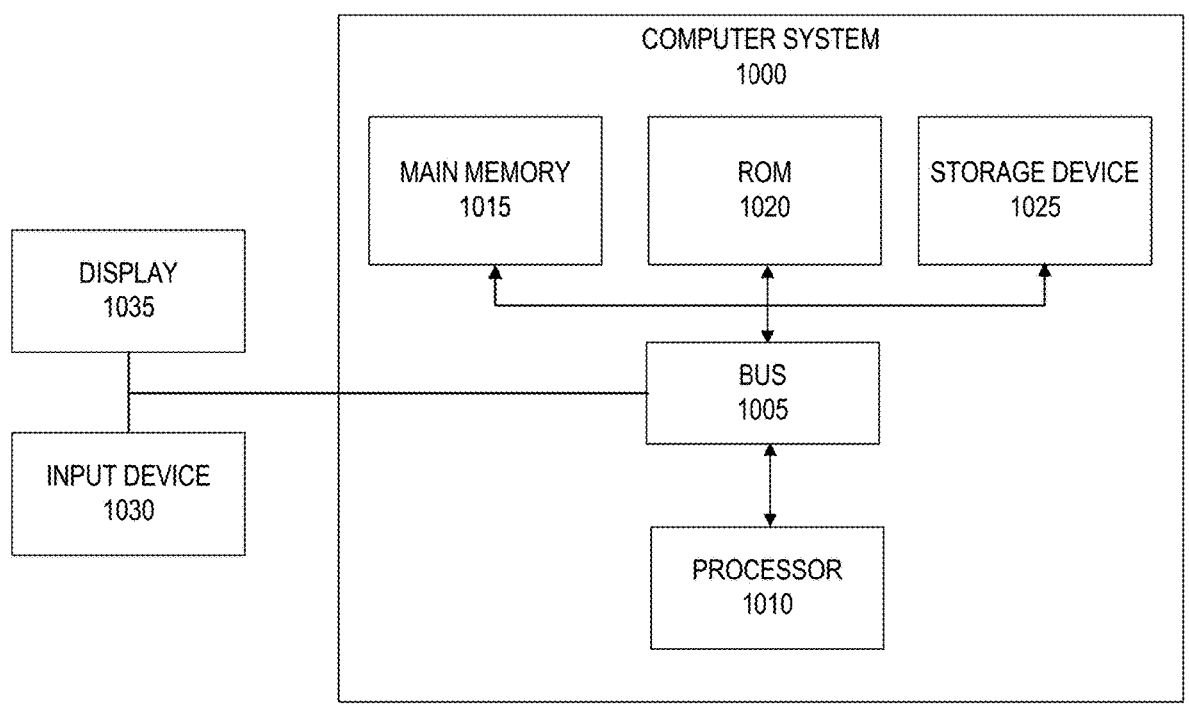
FIG. 10 is a block diagram of a computer system that can be used to implement systems and devices described in this disclosure.

FIG. 10 is a block diagram of a computer system 1000 that can be used to implement data processing system 102 or components thereof, the client device 128, data processing system 110, computing device 130, or any electronic device used to implement any of the methods or processes described in this disclosure. The computing system 500 includes a bus 1005 or other communication component for communicating information and a processor 1010 coupled to the bus 1005 for processing information. The computing system 1000 can also include one or more processors 1010 coupled to the bus 1005 for processing information. The computing system 1000 also includes main memory 1015, such as a RAM or other dynamic storage device, coupled to the bus 1005 for storing information, and instructions to be executed by the processor 1010. Main memory 1015 can also be used for storing position information, temporary variables, or other intermediate information during execution of instructions by the processor 510. The computing system 1000 may further include a ROM 1020 or other static storage device coupled to the bus 1005 for storing static information and instructions for the processor 1010. A storage device 1025, such as a solid state device, magnetic disk or optical disk, is coupled to the bus 1005 for persistently storing information and instructions. Computer system (or computer device) 1000 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 1000 may be coupled via the bus 1005 to a display 1035, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 1030, such as a keyboard including alphanumeric and other keys, may be coupled to the bus 1005 for communicating information and command selections to the processor 1010. In another implementation, the input device 1030 may be integrated with the display 1035, such as in a touch screen display. The input device 1030 can include a cursor control, such as a mouse, a trackball, or cursor direction keys, for communicating direction information and command selections to the processor 1010 and for controlling cursor movement on the display 1035.

According to various implementations, the processes or methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes or method ACTs described herein. One or more processors in a multi-processing arrangement may also be employed to execute the instructions contained in main memory 1015. In alternative implementations, hard-wired circuitry may be used in place of or in combination with software instructions to effect illustrative implementations. Thus, implementations are not limited to any specific combination of hardware circuitry and software.

Although an implementation of a computing system 1000 has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A computer system for merging adjacent word fragments in outputs of optical character recognition (OCR) systems, the computer system comprising:
   at least one processor; and
   a memory storing computer code instructions, the computer code instructions when executed by the at least one processor, cause the at least one processor to:
   obtain a plurality of word fragments associated with OCR data generated from an image, each word fragment of the plurality of word fragments associated with a respective text line of a plurality of text lines;
   determine, for each pair of adjacent word fragments in a text line of the plurality of text lines, a respective normalized horizontal distance between the pair of adjacent word fragments;
   identify, in the text line of the plurality of text lines, one or more pairs of adjacent word fragments that are candidates for merging based on the normalized horizontal distances;
   determine that a pair of adjacent word fragments, among the one or more pairs of adjacent word fragments that are candidates for merging, matches a predefined expression of a plurality of predefined expressions; and
   merge the pair of adjacent word fragments that matches the predefined expression into a single word, responsive to determining that the pair of adjacent word fragments matches the predefined expression.

2. The computer system of claim 1, wherein the image includes an image of a receipt.

3. The computer system of claim 2, wherein the plurality of predefined expressions includes an expression of prices associated with the receipt.

4. The computer system of claim 2, wherein the plurality of predefined expressions includes an expression of item codes or identifiers (IDs) associated with the receipt.

5. The computer system of claim 1, wherein the computer code instructions, when executed by the at least one processor, cause the at least one processor to:
   determine a length of a gap between the pair of adjacent word fragments; and
   divide the length of the gap between the pair of adjacent word fragments by a dimension of the image.

6. The computer system of claim 5, wherein the dimension of the receipt includes a width of the receipt.

7. The computer system of claim 5, wherein the dimension of the receipt includes a width of a text segment of the receipt.

8. The computer system of claim 1, wherein the computer code instructions, when executed by the at least one processor, cause the at least one processor to:
   compare, for each pair of adjacent word fragments in the text line of the plurality of text lines, the respective normalized horizontal distance between the pair of adjacent word fragments to a threshold value; and
   assign the pair of adjacent word fragments as a candidate for merging upon determining that the respective normalized horizontal distance between the pair of adjacent word fragments is smaller than or equal to the threshold value.

9. The computer system of claim 1, wherein the computer code instructions, when executed by the at least one processor, cause the at least one processor to:
  match three or more consecutive word fragments, among the one or more pairs of adjacent word fragments that are candidates for merging, to one other predefined expression among the plurality of predefined expressions; and
  merge the three or more consecutive word fragments into a single word, responsive to matching the three or more consecutive word fragments to the one other predefined expression.

10. The computer system of claim 1, wherein the plurality of word fragments are arranged into the plurality of text lines.

11. A method of merging adjacent word fragments in outputs of optical character recognition (OCR) systems, the method comprising:
  obtaining a plurality of word fragments associated with OCR data generated from an image, each word fragment of the plurality of word fragments associated with a respective text line of a plurality of text lines;
  determining, for each pair of adjacent word fragments in a text line of the plurality of text lines, a respective normalized horizontal distance between the pair of adjacent word fragments;
  identifying, in the text line of the plurality of text lines, one or more pairs of adjacent word fragments that are candidates for merging based on the normalized horizontal distances;
  determining that a pair of adjacent word fragments, among the one or more pairs of adjacent word fragments that are candidates for merging, matches a predefined expression of a plurality of predefined expressions; and
  merging the pair of adjacent word fragments that matches the predefined expression into a single word, responsive to determining that the pair of adjacent word fragments matches the predefined expression.

12. The method of claim 11, wherein the image includes an image of a receipt.

13. The method of claim 12, wherein the plurality of predefined expressions includes at least one of:
  an expression of prices associated with the receipt; or
  an expression of item codes or identifiers (IDs) associated with the receipt.

14. The method of claim 11, further comprising:
  determining a length of a gap between the pair of adjacent word fragments; and
  dividing the length of the gap between the pair of adjacent word fragments by a dimension of the image.

15. The method of claim 14, wherein the dimension of the receipt includes a width of the receipt.

16. The method of claim 14, wherein the dimension of the receipt includes a width of a text segment of the receipt.

17. The method of claim 11, further comprising:
  comparing, for each pair of adjacent word fragments in the text line of the plurality of text lines, the respective normalized horizontal distance between the pair of adjacent word fragments to a threshold value; and
  assigning the pair of adjacent word fragments as a candidate for merging upon determining that the respective normalized horizontal distance between the pair of adjacent word fragments is smaller than or equal to the threshold value.

18. The method of claim 11, further comprising:
  matching three or more consecutive word fragments, among the one or more pairs of adjacent word fragments that are candidates for merging, to one other predefined expression among the plurality of predefined expressions; and
  merging the three or more consecutive word fragments into a single word, responsive to matching the three or more consecutive word fragments to the one other predefined expression.

19. The method of claim 11, wherein the plurality of word fragments are arranged into the plurality of text lines.

20. A computer-readable storage device storing instructions that, when executed by one or more processors, cause the one or more processors to perform several operations for assigning word fragments to lines of text in optical character recognition (OCR) generated data, the operations comprise:
  obtaining a plurality of word fragments associated with OCR data generated from an image, each word fragment of the plurality of word fragments associated with a respective text line of a plurality of text lines;
  determining, for each pair of adjacent word fragments in a text line of the plurality of text lines, a respective normalized horizontal distance between the pair of adjacent word fragments;
  identifying, in the text line of the plurality of text lines, one or more pairs of adjacent word fragments that are candidates for merging based on the normalized horizontal distances;
  determining that a pair of adjacent word fragments, among the one or more pairs of adjacent word fragments that are candidates for merging, matches a predefined expression of a plurality of predefined expressions; and
  merging the pair of adjacent word fragments that matches the predefined expression into a single word, responsive to determining that the pair of adjacent word fragments matches the predefined expression.

* * * * *